United States Patent [19]

Hasha et al.

[11] Patent Number: 5,209,105
[45] Date of Patent: May 11, 1993

[54] METHOD AND APPARATUS FOR EXTERNALLY AND INTERNALLY TESTING FOR LEAKS IN CONNECTIONS BETWEEN TUBULAR MEMBERS

[76] Inventors: Malvern M. Hasha, 14655 Champion Forest Dr., #1802, Houston, Tex. 77069; Brian B. Hasha, 6114 Willowcrest Ct., Spring, Tex. 77389; Bruce B. Hasha, 11242-A Fremont Ave. N., Seattle, Wash. 98133

[21] Appl. No.: 540,916
[22] Filed: Jun. 20, 1990
[51] Int. Cl.⁵ .............................................. G01M 3/28
[52] U.S. Cl. ......................................... 73/49.1; 73/46
[58] Field of Search ........................... 73/49.5, 49.1, 46

[56] References Cited

U.S. PATENT DOCUMENTS

| | | | |
|---|---|---|---|
| 1,788,845 | 1/1931 | Reynolds | 73/46 |
| 1,931,502 | 10/1933 | Markle et al. | 73/46 |
| 2,571,236 | 10/1951 | Hamilton, Jr. | 73/46 |
| 2,817,230 | 12/1957 | McCully | 73/46 |
| 3,000,205 | 9/1961 | Suderow | 73/46 |
| 4,010,633 | 3/1977 | Hasha | 73/40 |
| 4,132,111 | 1/1979 | Hasha | 73/46 |
| 4,136,552 | 1/1979 | Hasha | 73/46 |
| 4,152,926 | 5/1979 | Hasha | 73/46 |
| 4,254,655 | 3/1981 | Keast et al. | 73/49.5 |
| 4,407,171 | 10/1983 | Hasha et al. | 73/46 |
| 4,416,147 | 11/1983 | Hasha | 73/49.6 |
| 4,429,566 | 2/1984 | Armell et al. | 73/49.1 X |
| 4,458,521 | 7/1984 | Pillette | 73/46 |

FOREIGN PATENT DOCUMENTS 3700384 7/1988 Fed. Rep. of Germany ....... 73/49.1
3806229 8/1989 Fed. Rep. of Germany ......... 73/46

Primary Examiner—Hezron E. Williams
Assistant Examiner—Joseph W. Roskos

[57] ABSTRACT

A method and apparatus for hydrostatically testing connections between segments of pipe whereby pressurized hydrostatic test fluid is selectively applied to the connection such that the pressures are principally applied in the vicinity of the radial orifices leading into the sealing elements of the connection and not radially to the inner or outer annular surfaces of the connection in the vicinity of the sealing elements of the connection which would tend to substantially affect the bearing pressure of the sealing elements. In addition, a method and apparatus for selectively applying pressurized hydrostatic test fluid such that the pressures are applied to those areas where the bearing pressure of the sealing elements of the connection is sensitive to the applied pressures, thus manipulating the bearing pressure and controlling the sealing capacity of the connection during hydrostatic leak testing. Additionally, an improved method and apparatus for internally hydrostatically testing the integral connection between two sections of pipe threaded together wherein the connection's seal is provided by the interference between mating surfaces on the corresponding male and female ends of the sections of pipe wherein pressurized hydrostatic test fluid is principally applied in the vicinity of the internal radial orifice leading into the sealing elements of the connection and pressurized hydrostatic fluid is selectively applied to the inside of the connection in the vicinity of the interference seal.

13 Claims, 16 Drawing Sheets

METHOD AND APPARATUS FOR EXTERNALLY AND INTERNALLY TESTING FOR LEAKS IN CONNECTIONS BETWEEN TUBULAR MEMBERS

BACKGROUND AND OBJECTS OF THE INVENTION

This invention provides an improved method and apparatus for the hydrostatic testing of the integrity of a connection between two sections of pipe. This Application is related to application Ser. No. 154,981 filed by Brian B. Hasha, Malvern M. Hasha and Bruce B. Hasha which on May 22, 1990 issued as U.S. Pat. No. 4,926,680.

In the oil and gas industry, individual stands or lengths of pipe (drill pipe or casing pipe) are referred to by various terms, including joints, sections or segments. When these sections of pipe are joined together to form the pipe string that will be inserted into the well hole, it is necessary to test the connections between the various stands of pipe in order to determine if the connections will leak when subjected to the hydrostatic pressures that may be encountered in the drilling operation, pressures resulting from the introduction of drilling mud and other substances into the drilling operation, pressures from fluids and gases in the earth that may be encountered during the drilling operation, and, of course, the pressures of the crude oil or gas which hopefully ultimately will be brought to the surface through the pipe string. A fluid leak through a connection in the pipe string can have significant adverse effects on the drilling operation, from having to remove the pipe string from the well to replace the leaking connection (a time consuming and costly procedure) to loss of the well (which, of course, is an even more costly event). Over the years, there have been a number of methods utilized to test the connections between the various joints of pipe in the string before or contemporaneously with the string being inserted into the well hole to determine if the connection is likely to leak. The most commonly utilized method is some sort of hydrostatic testing procedure. This invention provides an improved method and apparatus for the hydrostatic testing of the connections between stands of pipe.

Heretofore, the hydrostatic testing of connections between joints of pipe utilized for the production of oil and gas has been generally accomplished by sealing off above and below the connection, either internally within the pipe body or externally on the pipe body, injecting hydrostatic test fluid, such as water, "slick water" (water with a surfactant added), gas or mixed gas, between these sealing elements of the testing apparatus and against the connection, and observing for a leak or pressure drop in the hydrostatic test fluid through the connection by use of a gauge or "sniffer" device (such as a mass spectrometer in the case of gas or mixed gas testing). More specifically, the connections to be tested usually are made up to a specified torque in order to create a specific bearing pressure between the sealing surfaces of the two sections of pipe being connected together. While most such testing is performed with the connection in the fully made-up position, that is, optimum torque is applied to the two joints of pipe, some hydrostatic test methods allow for testing of a connection in a partially made-up state. In any event, subsequent to the connection being made-up, either partially or to optimum torque, as indicated above, hydrostatic pressure is then applied to the connection, either internally or externally, as part of the testing procedure. We have discovered that errors can result in the testing process as a result of the fact that in almost all types of connections, the individuals who designed the sealing surfaces of the pipe have taken into account, and, in fact, are relying on the hydrostatic pressures likely to be encountered in the drilling operation to assist in securing the connection's seal. Most pipe joints are intentionally designed such that the hydrostatic pressures encountered by the connection during the drilling operation affect the bearing pressure (often also referred to in the industry as the contact pressure) between the sealing surfaces of the connection—thus "setting" or effecting the sealing characteristics of the connection. In fact, some connections are designed whereby a unit of hydrostatic pressure applied across the connection causes a multiple of that unit change in the bearing pressure of the sealing portion of the connection. Indeed, because of this design philosophy, most connections leak not when encountering maximum hydrostatic pressures in the drilling and completion operation and throughout the productive life of the well, but rather when encountering relatively low hydrostatic pressures. We have discovered that because of this design philosophy, there is a likelihood the connection that will leak when subjected to relatively low hydrostatic pressures encountered during the drilling and completion operation and throughout the productive life of well will not be identified during the hydrostatic testing procedure. This is because in the prior art methods and apparatus for hydrostatically testing connections for leaks, the applied hydrostatic testing pressures themselves have the same effects as the designers contemplated for the hydrostatic pressures likely to be encountered during the drilling operations—the application of the pressures associated with the testing procedure itself "sets" or effects the sealing characteristics of the connection. We have discovered that depending upon the design of the sealing surfaces of the connection, the relative wall thickness of the mating sealing surfaces, and whether pressure is applied internally or externally, the bearing pressure between the connection's sealing surfaces may change significantly and thus obscure the fact that the connection is likely to leak when subjected to relatively low hydrostatic pressures encountered during the drilling and completion operation and throughout the productive life of the well. We have discovered that this change in the bearing pressure on the sealing surfaces of a connection as a result of the applied external or internal testing pressure is an important, perhaps even critical, factor in accurately determining the sealing capacity of most connections. There are, of course, certain types of joints, such as welded joints, in which if there is a leak in the connection, the leak path will be substantially perpendicular to the tubular pipe axis. In such cases, the locations and procedures for applying the test pressure to the connection is largely immaterial for purposes of the bearing pressure of the seal. However, the method and apparatus according to this invention is particularly useful in testing for leaks in a connection between casing or other types of tubing wherein the bearing pressure of the connection is sensitive to the pressure applied by the leak testing apparatus itself.

The improved method and apparatus for testing tubular connections according to this invention recognizes that the most accurate test method for predicting a connection's sealing capacity is that method which affects the connection's sealing surfaces bearing pressure the least per unit of applied pressure. The improved method and apparatus for testing tubular connections according to this invention applies pressure to specific surfaces of the connection in order to yield the least change in bearing pressure between the connection's sealing surfaces per unit of applied testing pressure.

We have also discovered there exists the very real possibility that a connection may be sensitive to varying load factors, such as tension or compression loads or loads introduced by temperature variations, that are common during the drilling and completion operations and during the productive life of the well, and/or have a cycle dependency such that the connection will leak upon subsequent pressure cycles. For example, the initial load cycle or pressure cycle may in some way introduce plastic strain into the connection and therefore reduce the connection's interference and bearing pressure of the sealing surfaces, or the connection's lubricant, sometimes referred to in the industry as pipe dope, may form an initial temporary seal during the initial pressure cycle but not hold during subsequent cycles since such a seal is not a reliable seal. The improved hydrostatic test method and apparatus according to this invention allows for the identification of these types of connections.

It is, therefore, an object of this invention to provide an improved method and apparatus for testing a connection between pipe joints in those situations in which the bearing pressure between the sealing surfaces of the connection is affected by the hydrostatic pressure of the testing fluid.

It is an additional object of this invention to provide an improved method and apparatus for testing a connection between pipe joints which is applicable for both internal and external testing and which applies pressure to specific surfaces of the connection in order to yield the least change in bearing pressure between the sealing surfaces of the connection per unit of applied testing pressure.

It is a further object of this invention to provide an improved method and apparatus for testing a connection between tubular members wherein the operator of the unit is provided the ability to selectively pulse or otherwise apply hydrostatic testing pressure in order to determine if the connection is sensitive to varying load factors or has a cycle dependency such that the connection may hold on the first initial pressure cycle but then leak on subsequent cycles.

It is a further object of this invention to provide an improved method and apparatus for testing a connection between tubular members wherein a plurality of pressure zones are established on the connection at locations designed to vary the bearing pressure between the sealing surfaces of the connection independent of the applied test pressure while observing for leaks before, during, and after varying the bearing pressure. The operator of the unit is provided the ability to selectively pulse or otherwise apply pressure in certain zones and observe pressure changes in other selected zones.

It is an object of this invention to provide an improved method and apparatus for testing a connection between pipe segments in which the bearing pressure of the connection is sensitive to the pressure applied by the leak testing apparatus itself and the operator is provided with data in a readily interpretable context in order to determine pressure anomalies.

Another specific object of this invention is to achieve the above objects with a visual graph or other display of the characteristics and results of the various parameters of the testing procedure.

Still another specific object is to achieve the above objects with computer-aided means for prescribing for a given connection the nature and extent of the pressure required at the specific locations to achieve or to substantially achieve accurate testing for the connection.

A further specific object is to meet the above objects with computer-aided means whereby digital data are available for control of automated apparatus to perform the testing method.

A further specific object is to achieve the above objects with a visual display of data which is recorded by a video cassette recorder or other means of permanent recordation for visual analysis later.

The invention itself, as well as additional objects and advantages thereof, will become apparent from the following description in connection with the accompanying drawings, in which like numerals represent like parts:

DESCRIPTION OF THE PREFERRED EMBODIMENT

Figure 1A:
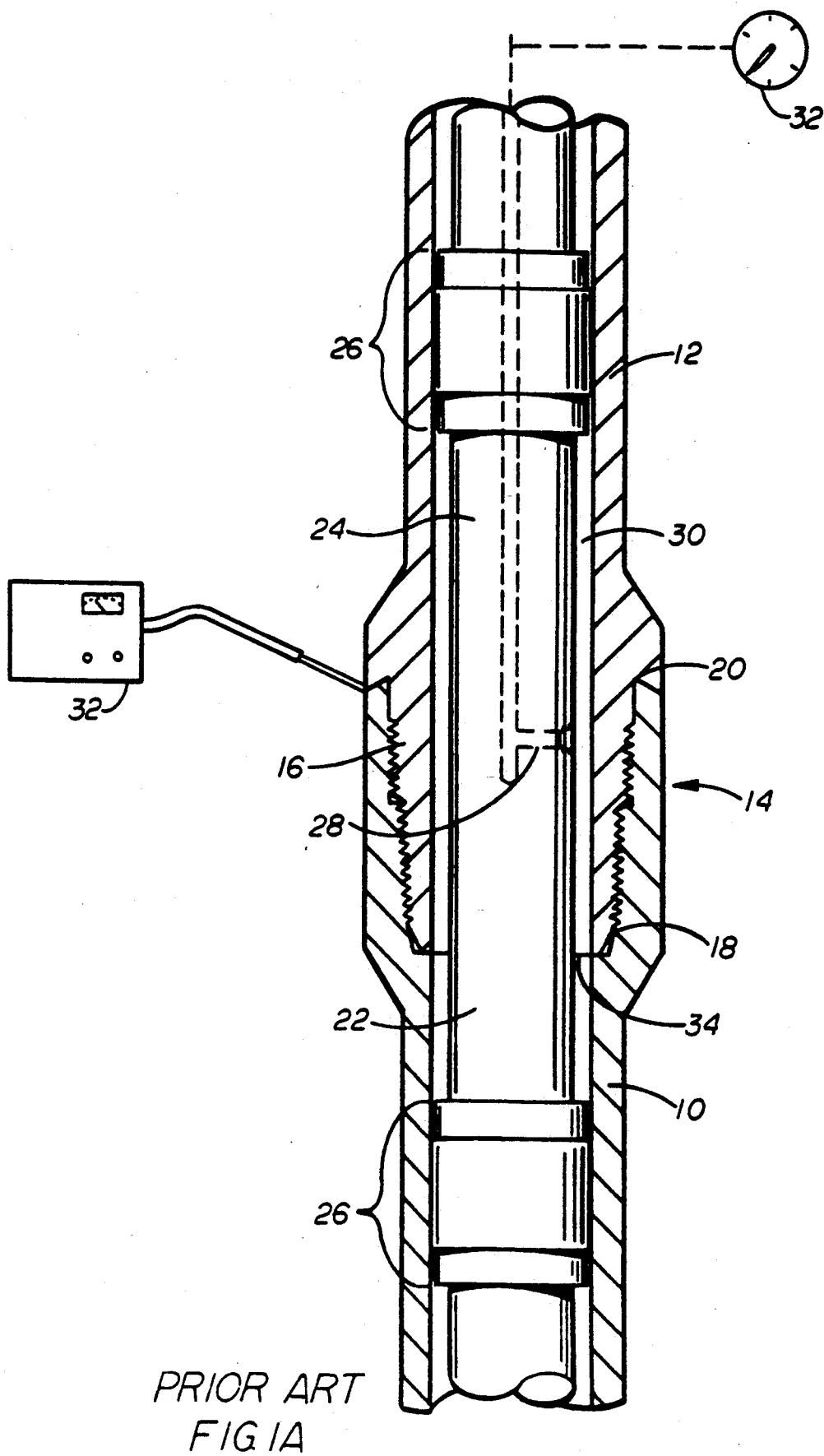
FIG. 1A is a longitudinal cross-sectional view of a prior art internal testing apparatus utilized to test an integral connection formed by threading together two joints of pipe.

Referring now to FIG. 1A, there is shown in longitudinal cross-sectional view pipe joints 10 and 12 threaded together to form an integral connection generally identified by the numeral 14. There are many types of integral connections used in the oil and gas industry. In FIG. 1A, and in the other figures showing an integral connection unless otherwise indicated, the type of connection shown is known in the industry as a "Hydril type" connection. The "Hydril-type" connection was chosen as an example due to the fact that the bearing pressure of its sealing elements is highly sensitive to the applied pressure of the testing fluid. In a "Hydril-type" connection, the threads 16, whether they be interference threads (that is, threads which in one fashion or another correspondingly compress and expand slightly into each other) or non-interference threads, typically engage the sealing surfaces but do not form a seal themselves. Rather, the seal is effected by the interference formed by mating corresponding annular surfaces on the male and female ends of the pipe segments, such seals being identified in FIG. 1A by the numerals 18 and 20. It is the bearing pressure of these sealing elements, the annular surfaces forming the seals designated as 18 and 20, that can become critical to the accuracy of the testing procedures. In the "Hydril-type" connection, the sealing element 18 is engaged first. At approximately ten percent (10%) make-up a low torque hydrostatic test can be performed on the interference seal 18. When the connection is in the fully made-up position, that is, optimum torque is applied to the two joints of pipe, sealing element 20 is fully engaged and can be tested.

Positioned within the connected pipe joints for accomplishing internal testing of the connection 14 is a prior art testing apparatus generally identified by the numeral 22. The internal testing apparatus includes an elongated tubular member 24 having packer means 26 on either end thereof for sealing above and below the connection 14. Hydrostatic testing fluid is introduced through conduit 28 into the annular chamber 30 formed between the elongated tubular member 24 of the testing apparatus and the internal surfaces of the pipe joints 10 and 12 in the connection 14. A leak in the connection 14 is detected by the use of commercially available means 32, such as, a Totco dual needle gauge, part #215041-104, for detecting a loss of the water from the annular test chamber 30 or, in the case that gas is utilized as the hydrostatic testing medium, a "sniffer," such as, a Deluxe Gas Detector, model #21-250 manufactured by Gow-Mac. The bearing pressure of the interference seals 18 and 20 of the connection 14 is sensitive to the pressure applied by the leak testing fluid within the annular chamber 30 across the connection 14. Thus, as the testing fluid applies pressures against the internal annular surface of the connection 14 formed between pipe joints 10 and 12, the bearing pressure of the interference seals 18 and 20 of the connection is affected. As a result, the benefits of the seal design can have the effect of "hiding" the fact that the connection is likely to leak when subjected to relatively low hydrostatic pressures or other load factors previously discussed encountered during the drilling and completion operations and throughout the productive life of the well.

Figure 1B:
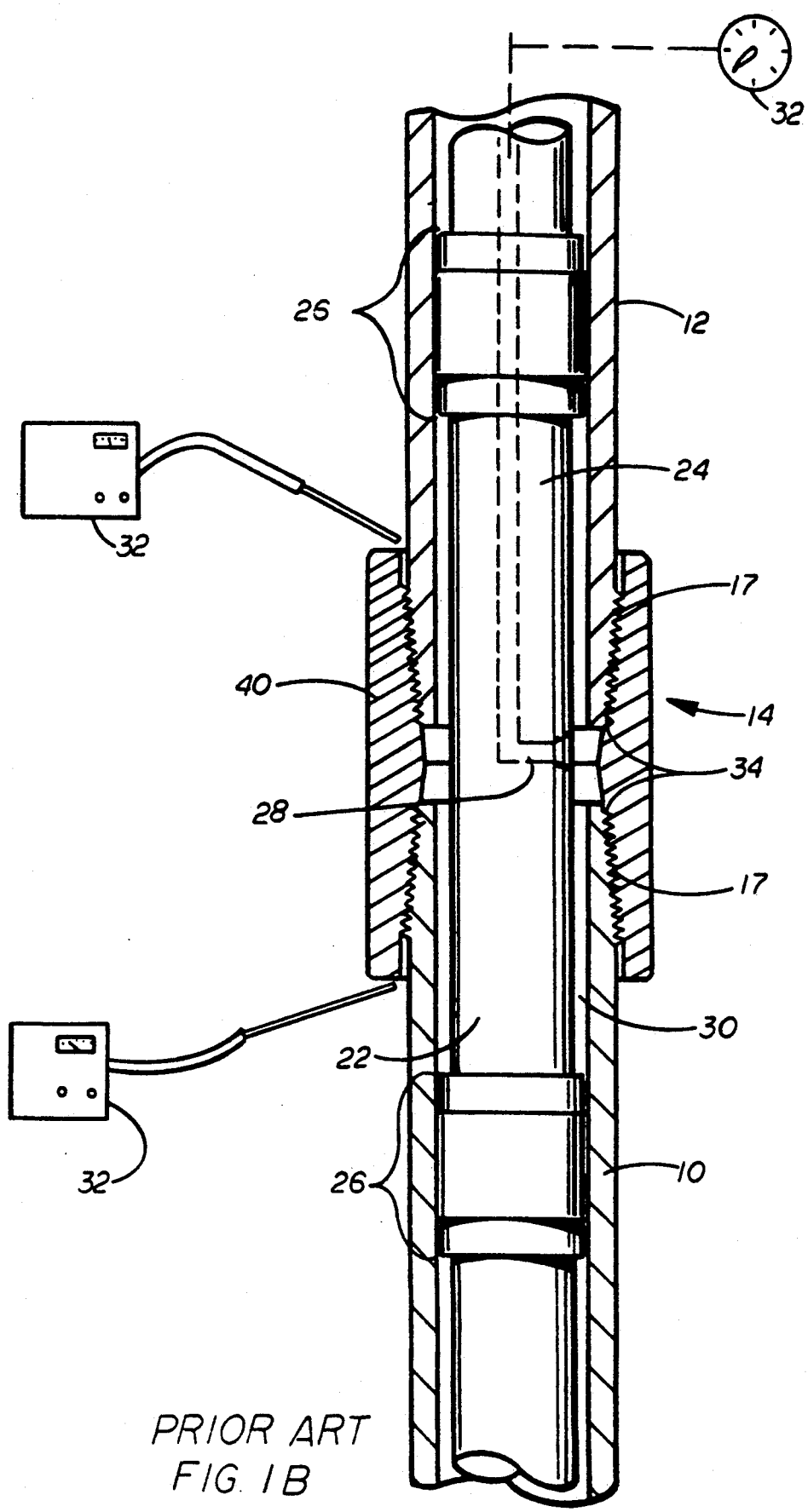
FIG. 1B is a longitudinal cross-sectional view of a prior art internal testing apparatus utilized to test a connection formed by threading two joints of pipe into a coupling.
Figure 2A:
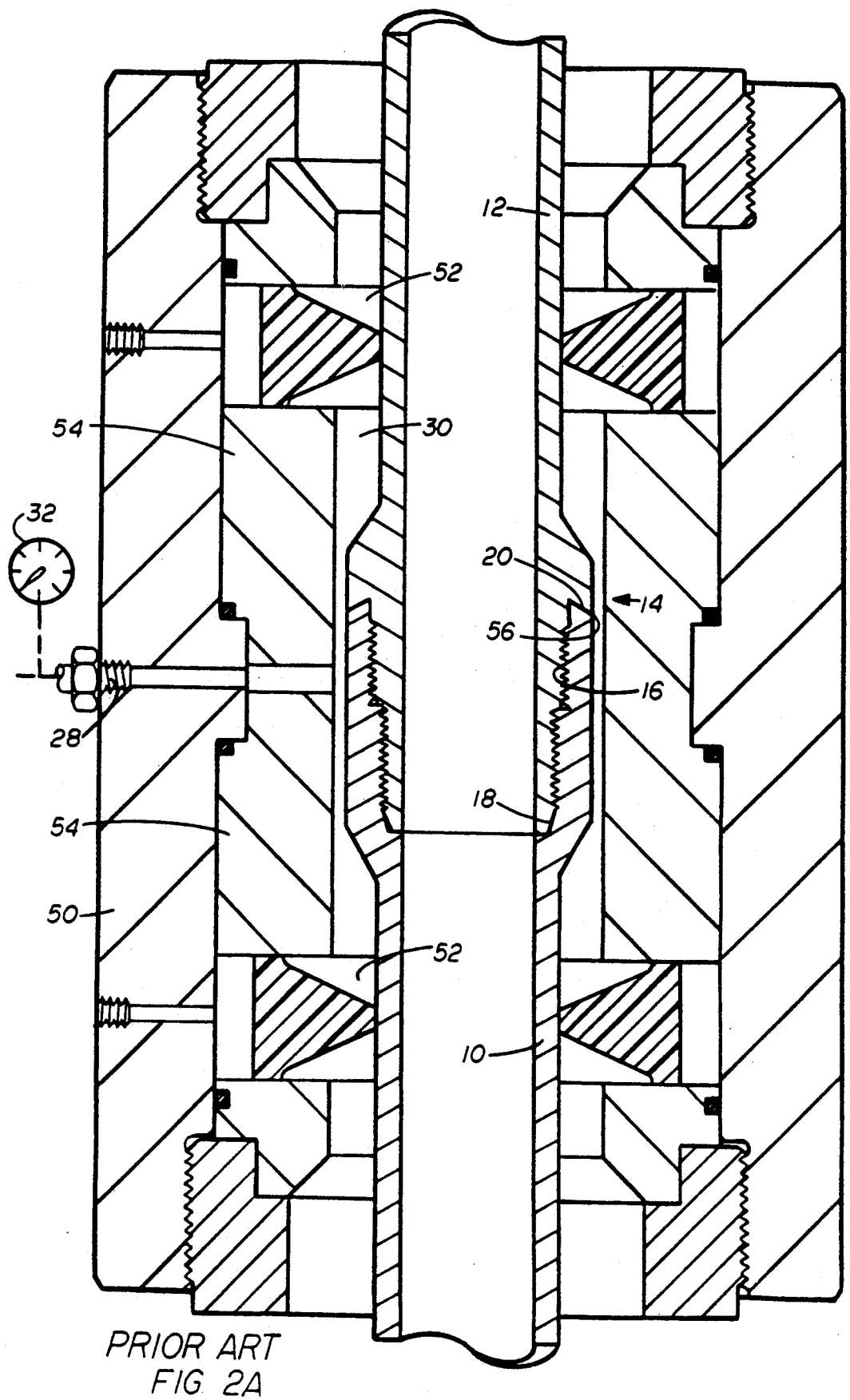
FIG. 2A is a longitudinal cross-sectional view of a prior art external testing apparatus utilized to test an integral connection formed by threading together two joints of pipe.

Similarly, FIG. 1B is a longitudinal cross-sectional view of a prior art internal testing apparatus utilized to test a connection formed by threading two joints of pipe into a coupling. Pipe joints 10 and 12 are threaded into a coupling 40, to form a connection generally identified by the numeral 14. There are many types of couplings used in the oil and gas industry. The type of coupling shown in FIG. 1B, and in the other figures showing a coupling, utilizes interference sealing threads with an annular area that is not part of the sealing means, and has annular ends that are larger in diameter than the pipe sections threaded therein and present outer annular faces substantially perpendicular to the pipe axis on either end thereof. Thus, the type of connection shown in FIG. 1B differs from the "Hydril-type" connection shown in FIG. 1A in that substantially all of the threads 17 along the connection are designed to be interference sealing threads and thus constitute the sealing element of the connection. Positioned within the connected pipe joints for accomplishing internal testing of the connection 14 is a prior art testing apparatus generally identified by the numeral 22. The internal testing apparatus again includes an elongated tubular member 24 having packer means 26 on either end thereof for sealing above and below the connection 14. Testing fluid is introduced through conduit 28 into the annular chamber 30 formed between the elongated tubular member 24 of the testing apparatus and the internal surfaces of the pipe joints 10 and 12 and the coupling 40 forming the connection 14. A leak in the connection 14 is detected by the use of commercially available means 32, such as, a Totco dual needle gauge, part #215041-104, for detecting a loss of the water from the annular test chamber 30 or, in the case that gas is utilized as the hydrostatic testing medium, a "sniffer," such as, the Deluxe Gas Detector, model 21-250 manufactured by Gow-Mac. The bearing pressure of the interference threads 17 within the connection 14 is sensitive to the pressure applied by the leak testing fluid within the annular chamber 30. Thus, as the testing fluid applies pressures against the internal surface of the connection 14 formed between pipe joints 10 and 12 and the coupling 40 into the two radial orifices 34 leading from the annular chamber 30 into the threads 17 and against the interference threads 17 of the connection 14, the bearing pressure of the interference threads is affected. Again, the benefits of the seal design can have the effect of "hiding" the fact that the connection is likely to leak when subjected to relatively low hydrostatic pressures or other load factors previously discussed encountered during the drilling and completion operations and throughout the productive life of the well. Referring to FIG. 2A, there is shown in longitudinal cross-sectional view a prior art testing apparatus utilized to test externally an integral "Hydriltype" connection formed by threading together two joints of pipe 10 and 12. This external testing method and apparatus, identified generally by the numeral 50, might well be of the type shown in U.S. Pat. Nos. 4,132,111 and 4,136,552 to Malvern M. Hasha utilizing annular sealing means 52 of the type shown in U.S. Pat. No. 4,010,633 to Malvern M. Hasha. Testing fluid is introduced through conduit 28 into the annular chamber 30 formed between the ring-shaped spacer member 54 of the testing apparatus 50 and the outside annular surfaces of the threaded pipe joints 10 and 12 in the area of the connection generally identified by the numeral 14. A leak in the connection 14 is detected by the use of commercially available means 32, such as, a Totco dual needle gauge, part #215041-104, for detecting a loss of the water from the annular test chamber 30. Again, the bearing or contact pressure of the interference seals 18 and 20 of the connection 14 is sensitive to the pressure applied by the leak testing fluid within the annular chamber 30 during this external testing of the connection, although not as sensitive as if the testing pressure were being applied internally. Thus, as the testing fluid applies pressures against the external surface of the connection 14 formed between pipe joints 10 and 12 and (i) into the external radial orifice 56 leading from the annular chamber 30 into the threads 16 and on to the interference seal 18 of the connection 14 in the low torque mode, or (ii) against interference seal 20 of the connection 14 in the optimum torque make-up condition, the bearing pressure of the interference seals 18 and 20 of the connection is affected. As a result, the external testing method of the prior art method and apparatus may actually affect the sealing capability of the connection and thus produce a less accurate test result.

Figure 2B:
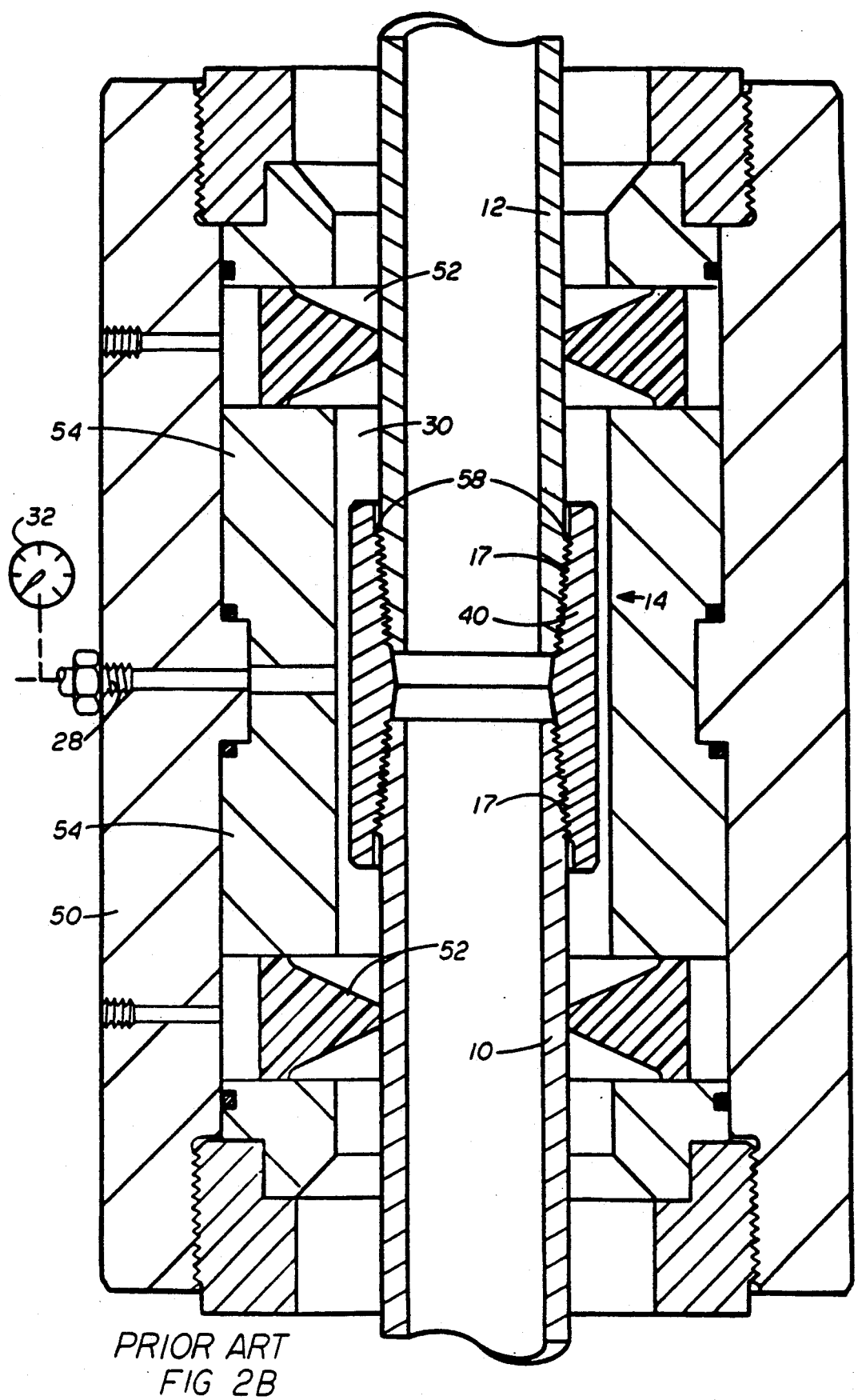
FIG. 2B is a longitudinal cross-sectional view of a prior art external testing apparatus utilized to test a connection formed by threading two joints of pipe into a coupling.

Similar to FIG. 2A, FIG. 2B is a longitudinal cross-sectional view of a prior art external testing apparatus utilized to test a connection formed by threading two joints of pipe into a coupling of the type discussed with respect to FIG. 1B. Pipe joints 10 and 12 are threaded into a coupling 40 to form a connection generally identified by the numeral 14. Positioned around the connected pipe joints for accomplishing external testing of the connection 14 is a prior art testing apparatus generally identified by the numeral 50. This external testing apparatus 50 again might be of the type shown in U.S. Pat. Nos. 4,132,111 and 4,136,552 to Malvern M. Hasha utilizing annular sealing means 52 of the type shown in U.S. Pat. No. 4,010,633 to Malvern M. Hasha. Testing fluid is introduced through conduit 28 into the annular chamber 30 formed between the ring-shaped spacer member 54 of the testing apparatus 50 and the outside annular surfaces of the threaded pipe joints 10 and 12 and the coupling 40 in the area of the connection 14. A leak in the connection 14 is detected by the use of commercially available means 32, such as, a Totco dual needle gauge, part #215041-104, for detecting a loss of the water from the annular test chamber 30. Again, the bearing pressure of the interference sealing threads 17 is sensitive to the pressure applied by the leak testing fluid within the annular chamber 30. Thus, as the testing fluid applies radial pressures against the external annular surface of the connection 14 formed between pipe joints 10 and 12 into the two radial orifices 58 leading from the annular chamber 30 into the interference sealing threads. 17 of the connection 14, the bearing pressure of the interference sealing threads 17 is affected. Once again, the external testing method of the prior art method and apparatus may actually affect the sealing capability of the connection and thus produce a less accurate test result.

Figure 3:
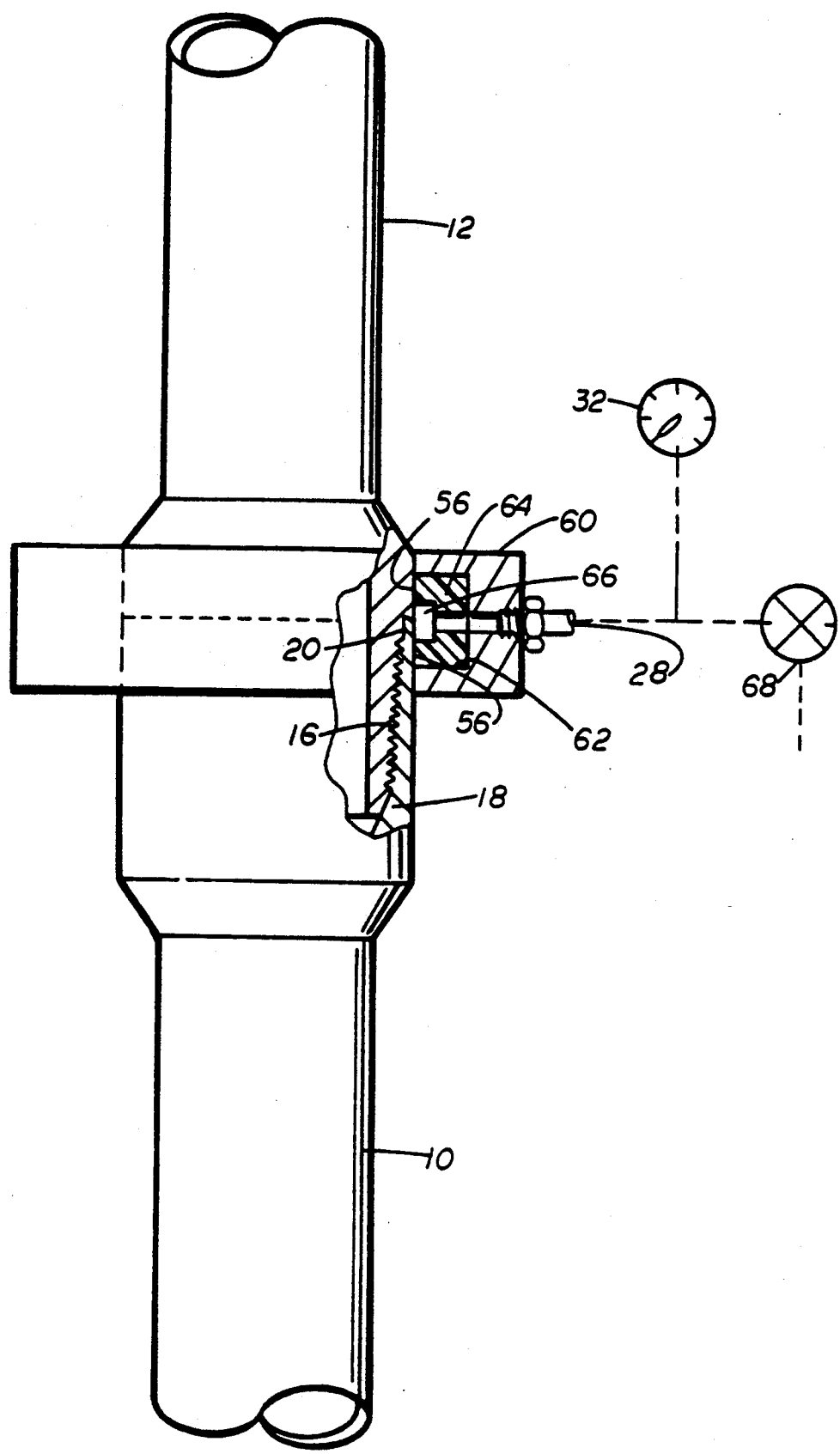
FIG. 3 is a longitudinal cross-sectional view of a threaded pipe connection including the improved method and apparatus of the invention to test the connection externally.

Referring now to FIG. 3, there is shown in longitudinal cross-sectional view an integral connection 14 formed by threading together two joints of pipe 10 and 12. An embodiment of the improved method and apparatus according to this invention is shown being utilized to test the connection externally. The apparatus comprises an annular housing or body 60 which surrounds the outer circumference of the connection 14 in a selected localized area. The annular housing 60 is structured to provide within itself an annular opening or groove 62. Secured within this annular groove is a self-sealing packer 64 or like elastomer material. The self-sealing material 64 is formed to present a small annular chamber 66 which receives the testing fluid introduced through conduit 28 extending through housing 60 and applies the pressure of the testing fluid against the radial orifice 56 leading through interference seal 20 of the connection 14 into the threads 16 and against interference seal 18. The self sealing material 64 operates responsive to the pressure of the testing fluid to sealingly engage against the outer circumferential surface of the connection 14 formed between pipe joints 10 and 12 at a selected localized area thereof. The housing 60 and the self-sealing packer material 64 are sized and positioned such that when the test fluid is introduced into annular chamber 66, the annular self-sealing material 64 seals against the connection 14 immediately adjacent the external radial orifice 56 and on either side thereof. Thus, the annular housing contains means for sealingly engaging the connection in the immediate vicinity of and on either side of the external radial orifice leading into the connection's threads and provides an annular chamber which is in fluid communication with the radial orifice when the sealing means contained within the housing are in sealing engagement with the connection. Valve means 68 are associated with the housing for admitting into the annular chamber 66 the pressurized hydrostatic testing fluid. The valve means may be any of numerous commercially available valves, such as, a Barksdale two-way valve, part #2191-R9AM2. Also in fluid communication with the annular chamber are means 32 for detecting a possible leak in the connection 14 by detecting a loss of the hydrostatic test fluid from the annular chamber 66 through the connection's sealing element.

As explained above, in a threaded seal of the type shown in FIG. 3, the threads 16, whether they be interference or non-interference threads, usually are not designed to constitute the sealing element. Rather, the sealing elements comprise the seals 18 and 20 formed by the interference between mating corresponding annular surfaces on the male and female ends of the pipe joints 10 and 12. We have discovered that any change in the bearing or contact pressure in the vicinity of the non-sealing surfaces of the threaded connection has little adverse effect on the accuracy of the testing process. However, we have discovered that a change in the bearing or contact pressure of the interference seals 18 and 20 is likely to hide the fact that the connection may leak when subjected to relatively low hydrostatic pressures or other load factors previously discussed encountered during the drilling and completion operations and throughout the productive life of the well. Thus, in the improved method and apparatus according to this invention, where the external hydrostatic test is performed at approximately ten percent (10%) make-up such that the interference seal 20 is not engaged, the hydrostatic testing fluid is introduced through conduit 28 into the annular chamber 66 such that the test pressures are principally applied in the vicinity of the external radial orifice 56. The hydrostatic test pressure then flows through the threads 16 and is applied against interference seal 18 to test that seal for leaks. However, there are no substantial hydrostatic testing pressures applied radially to the outer annular surface of connection 14 in the radial vicinity of the interference seal 18, thereby avoiding any substantial change in the bearing pressure of interference seal 18 which might adversely affect the accuracy of the test. Moreover, the improved method and apparatus according to this invention does not seal the connection above and below the interference seal which too can cause a change in the bearing or contact pressure of the interference seal 18 and thereby adversely affect the accuracy of the testing process.

Figure 4A:
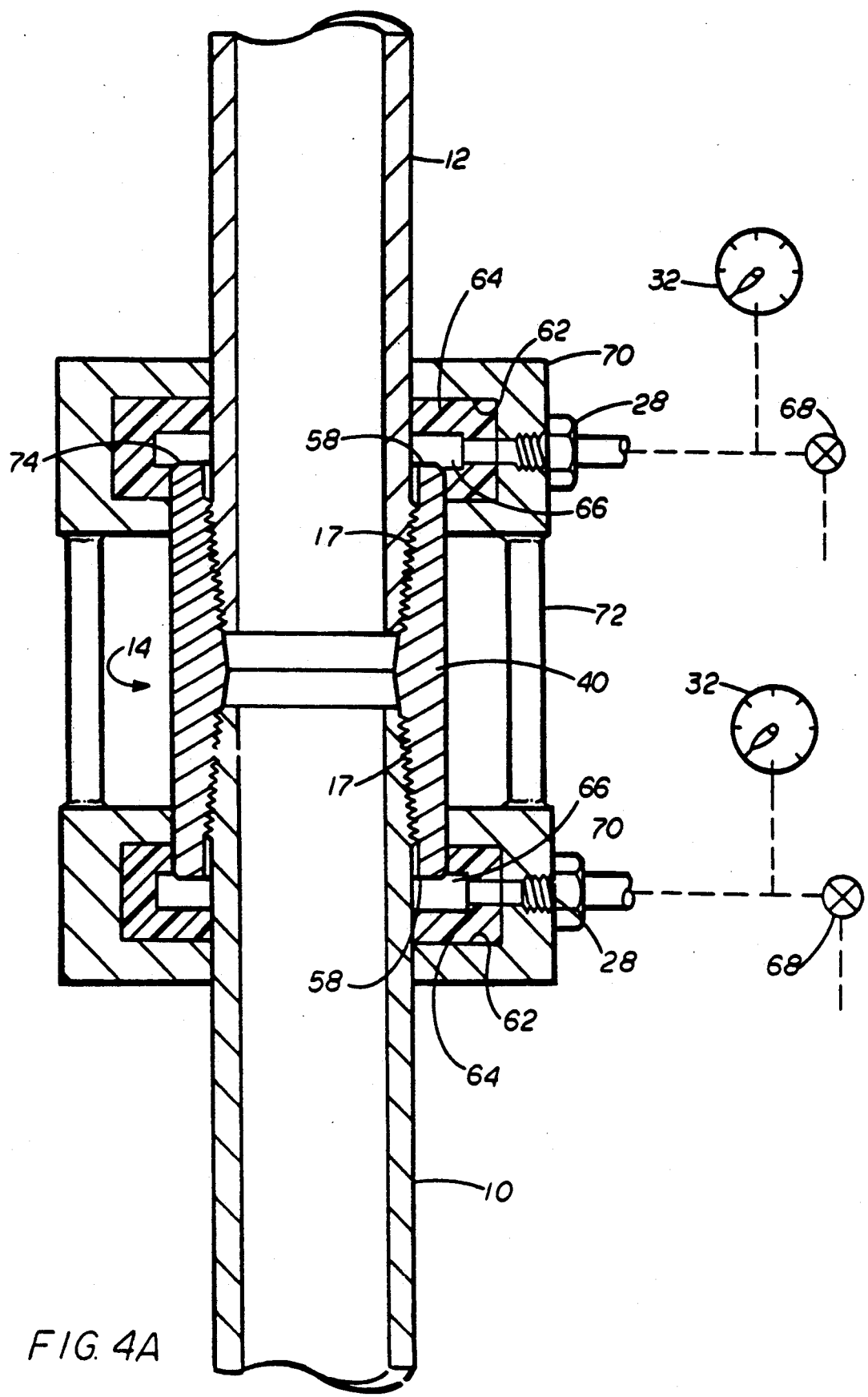
FIG. 4A is a longitudinally cross-sectional view of a threaded pipe connection showing the details of an apparatus for externally testing of the connection.

FIG. 4A is a longitudinal cross-sectional view of a connection formed between two joints of pipe threaded into a coupling with an embodiment of the improved method and apparatus according to this invention being utilized to test the connection externally. The apparatus preferably comprises two annular housings or bodies 70, each of which surrounds the outer circumference of the connection 14 in a selected localized area. Depending on the means used to seal the housings to the outer circumference of the connection 14, the two annular housings 70 may be split so as to facilitate being latched around the connection. The two annular housings 70 preferably are connected together by a annular plate or a series of rods 72. As discussed above with respect to FIG. 3, each annular housing is structured to provide within itself an annular opening or groove 62. Secured within this annular groove is a self-sealing packer 64 or like elastomer material. The self-sealing material 64 is formed to present a small annular chamber 66 which receives the testing fluid introduced through conduit 28 extending through housing 70 and applies the pressure of the testing fluid against the radial orifices 58 leading into the connection's sealing element, that is, the interference threads 17. The selfsealing material 64 operates responsive to the pressure of the testing fluid to sealingly engage against the outer circumferential surface of the connection 14 formed between pipe joints 10 and 12 at a selected localized area thereof. The housing 70 and the self-sealing packer material 64 are sized and positioned such that when the test fluid is introduced into annular chamber 66, the annular self-sealing material 64 seals against the connection 14 immediately adjacent the radial orifice 58 and on either side thereof. Valve means 68 are associated with the housing for admitting into the annular chamber 66 the pressurized hydrostatic testing fluid. The valve means may be any of numerous commercially available valves, such as a Barksdale two-way valve, part #2191R9AM2. Also in fluid communication with the annular chamber are means 32 for detecting a possible leak in the connection 14 by detecting a loss of the hydrostatic test fluid from the annular chamber 66 through the connection's sealing element.

In a threaded seal of the type shown in FIG. 4A, most of the threads themselves are designed to provide an interference seal. Thus, in the threaded connection 14 shown in FIG. 4A formed by threading the two joints of pipe 10 and 12 into the coupling 40, a seal is formed along the threaded surfaces 17 by the interference caused by mating the sealing surfaces. However, we have discovered that in the vicinity of the outer annular surface of the coupling 40 in the area generally shown by the numeral 74, there is no interference seal formed and that if the pressure of the testing fluid is applied against the connection 14 in the vicinity of the area 74 of the coupling whereby the radial pressures imposed by such test fluid are substantially limited to the annular area 74 of the coupling, there will be no significant change in the bearing or contact pressure in the portion of the connection's threads 17 which provide the interference seal. As such, if the applied test pressures are limited to the vicinity of the area 74 of the coupling, there will be no significant adverse impact on the accuracy of the testing procedure as a result of the application of the testing pressures themselves.

Figure 4B:
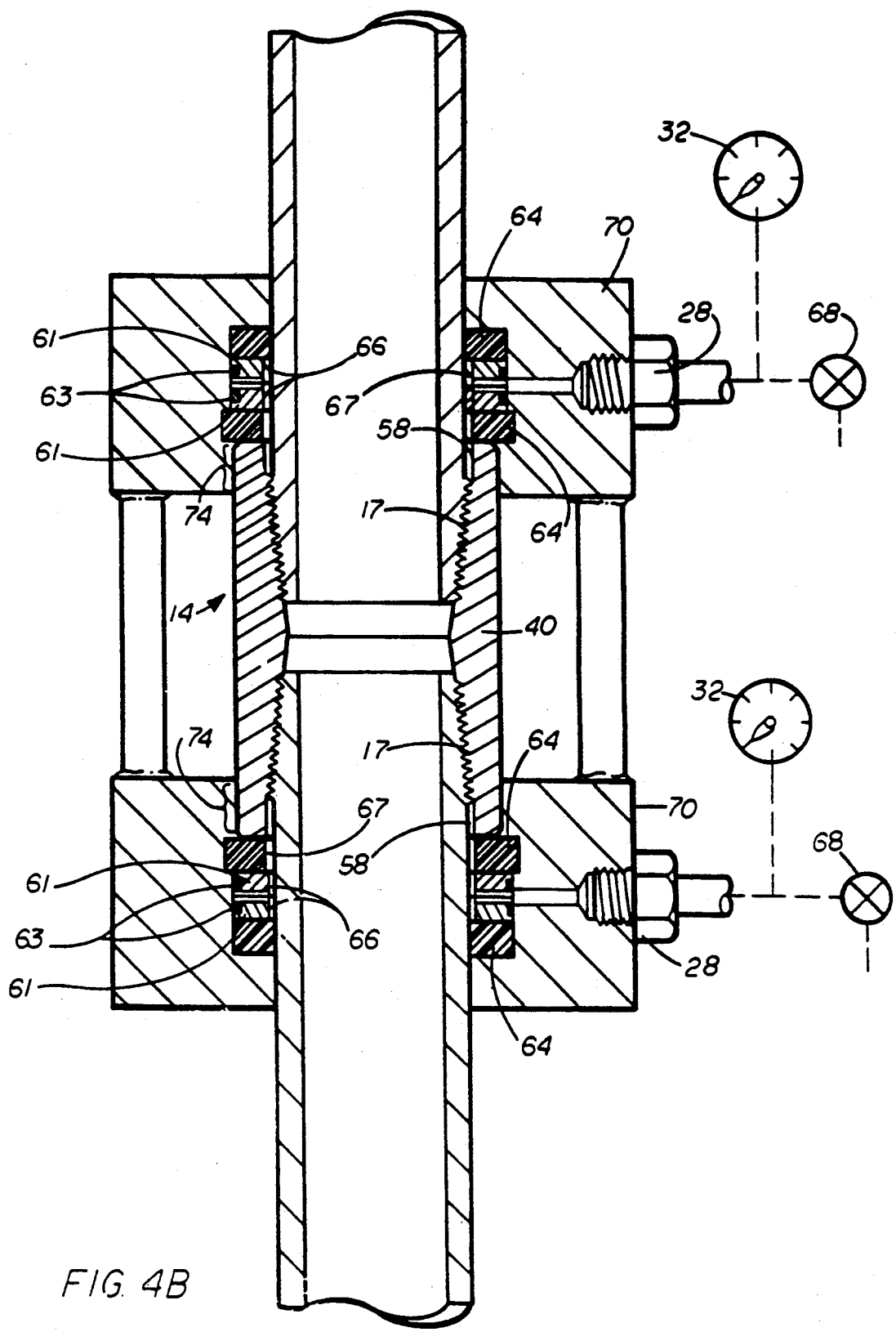
FIG. 4B is a view similar to FIG. 4A of another apparatus of the present invention for externally testing the connection.

In the embodiment of the improved method and apparatus according to this invention shown in FIG. 4B, the housing 70 and the self-sealing material 64 contained therein are constructed whereby during the testing procedures a sealing engagement is established against the outer annular face of the coupling 40 and the outer circumferential surface of the adjacent joint of pipe threaded into the coupling 40 at that location. The pressurized hydrostatic testing fluid is supplied through conduit 28 between compression discs 61 into annular chamber 66 containing slotted retainer ring 67. O-rings 63 seal compression discs 61 against housing 70 as the compression discs assist in engaging the self-sealing packer material 64 against the connection 14. Thus, when the pressurized hydrostatic testing fluid is in fluid communication with the radial orifice 58 leading into the interference threads 17, the pressures of the testing procedure are applied radially against the outer circumferential surface of the adjacent joint of pipe threaded into the coupling 40 and longitudinally through the slotted retainer ring 67 against the outer annular face of the coupling 40, rather than even radially against the annular area 74 of the coupling. As such, the applied test pressures do not apply radial pressures to the interference seal formed by the threads 17 and thus do not affect the bearing pressure of such interference seal and, accordingly, there is no significant adverse impact on the accuracy of the testing procedure as a result of the application of the testing pressures themselves. Moreover, the improved method and apparatus according to this invention does not seal the connection above and below the interference seal formed by the threads 17 which too can cause a change in the bearing pressure of the interference threads 17 and thereby adversely affect the accuracy of the testing process.

Figure 5:
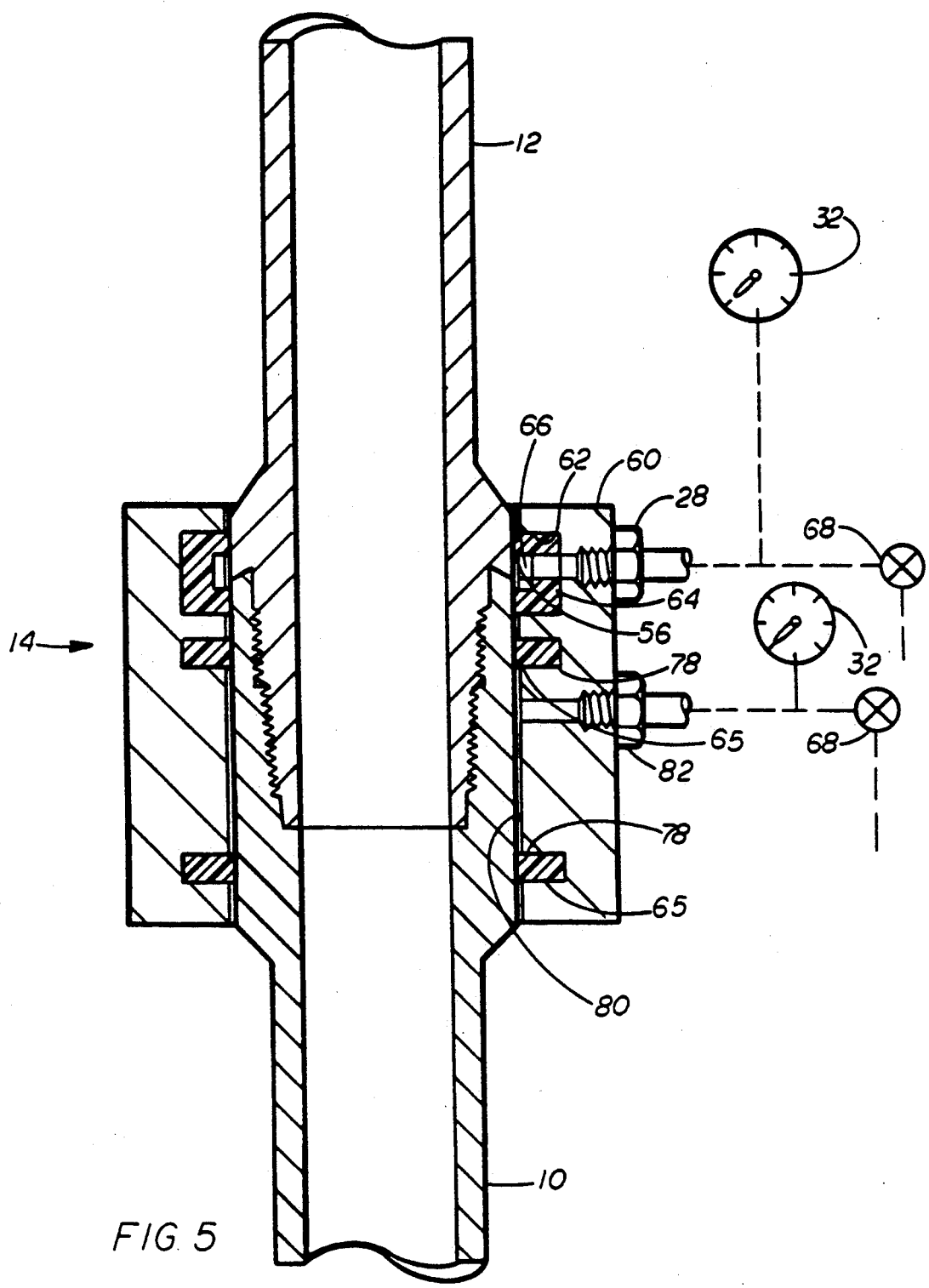
FIG. 5 is a longitudinal cross-sectional view of a threaded pipe connection illustrating another form of the improved method and apparatus of the present invention for testing the threaded connection.

FIG. 5 is a longitudinal cross-sectional view of an integral connection formed by two joints of pipe threaded together with an embodiment of the improved method and apparatus according to this invention having multiple test chambers being utilized to test the connection externally. The apparatus comprises an annular housing or body 60 which surrounds the outer circumference of the connection 14. The annular housing is structured to provide within itself a narrow annular opening or groove 62 similar to the one shown in FIG. 3. Secured within this annular groove is a self-sealing packer 64 or like elastomer material. The self-sealing material 64 is formed to present a small annular chamber 66 which receives the testing fluid introduced through conduit 28 extending through housing 60. The self-sealing material 64 operates responsive to the pressure of the testing fluid to sealingly engage against the outer circumferential surface of the connection 14 formed between pipe joints 10 and 12 at a selected localized area thereof. The housing 60 and the self-sealing packer material 64 are sized and positioned such that when the test fluid is introduced into annular chamber 66, the annular self-sealing material 64 seals against the connection 14 immediately adjacent the radial orifice 56 and on either side thereof. Thus, in the improved method and apparatus according to this invention, where the external hydrostatic test is performed at approximately ten percent (10%) make-up so that the interference seal 20 is not engaged, the testing fluid applies pressure against the radial orifice 56 leading through the not fully engaged interference seal 20 into the threads 16 and against interference seal 18.

Figure 6A:
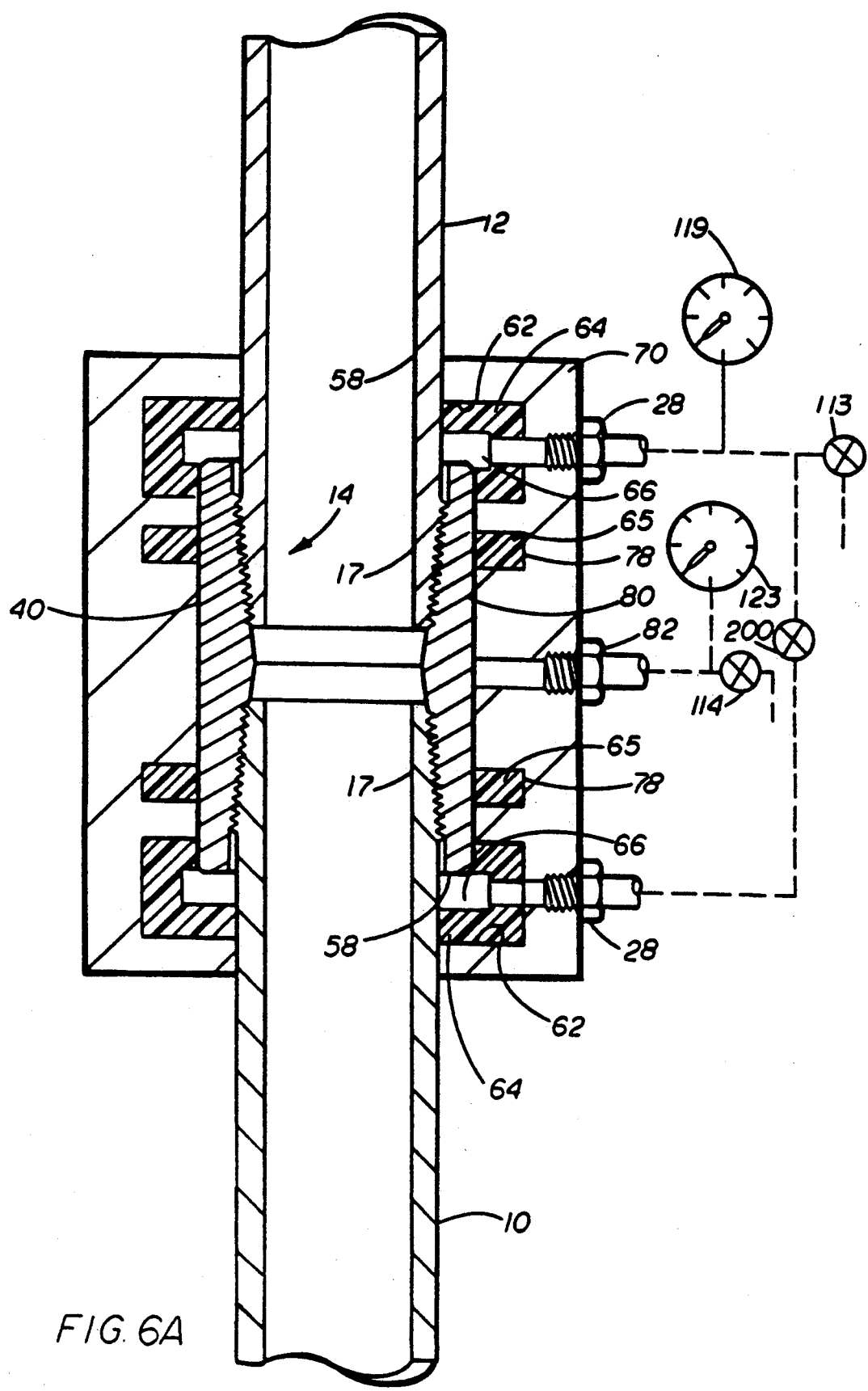
FIG. 6A is a longitudinal cross-sectional view of still another improved testing method and apparatus of the present invention for externally testing the threaded joint.

The annular housing 60 is also structured to provide a second means for sealingly engaging the connection in a annular selected area in the vicinity of the connection's sealing element for the purpose of allowing the application of radial pressure against the connection to affect the bearing pressure of the connection's sealing element under controlled conditions. Preferably these means for sealingly engaging the connection comprise two longitudinally spaced apart annular chambers 78 in which is positioned self-sealing material 65. Preferably the housing provides an annular chamber 80 surrounding the outer circumference of the connection in the radial vicinity of the sealing element 18 and providing fluid communication between the spaced apart sealing means 65. As the bearing pressure of the connection's sealing element 18, the interference seal formed between mating annular surfaces on the male and female ends of the pipe sections, is sensitive to the pressure of hydrostatic fluid applied within annular chamber 80, leak testing fluid or other hydrostatic fluid may be introduced through conduit 82 into annular chamber 80 at controlled pressures to manipulate the bearing pressure of the interference seal 18. Manipulation of the bearing pressure in this manner is independent from and not affected by the introduction of testing fluid through conduit 28 into the annular chamber 66. The manipulation of bearing pressure is useful in partially simulating the pressures encountered during the drilling and completion operations and throughout the productive life of the well without totally distorting the sealing capability of the connection 14. FIG. 6A is a longitudinal cross-sectional view of a connection formed between two joints of pipe threaded into a coupling with an embodiment of the improved method and apparatus according to this invention having multiple test chambers being used to test the connection externally. The apparatus preferably comprises an annular housing or body 70 surrounding the outer circumference of the connection 14. Depending on the means used to seal the housing to the outer circumference of the connection 14, the housing may be split so as to facilitate being latched around the connection. The annular body 70 is structured to provide within itself two narrow annular openings or grooves 62. Within each annular groove 62 is a self-sealing packer material 64 or like elastomer material. The self-sealing material 64 is formed to present small annular chambers 66 which receive the testing fluid introduced through conduits 28 extending through housing 70 that applies pressure against the radial orifices 58 leading into the interference sealing threads 17 of the connection 14. The self-sealing material 64 operates responsive to the pressure of the testing fluid to sealingly engage against the outer circumferential surface of the connection 14 formed between pipe joints 10 and 12 at a selected localized area thereof. The housing 70 and the self-sealing packer material 64 are sized and positioned such that when the test fluid is introduced through conduits 28 into annular chambers 66, the annular selfsealing materials 64 seal against the connection 14 immediately adjacent the radial orifices 58 and on either side thereof.

The annular housing or body 70 is also structured to provide another annular chamber So located in a selected area in the vicinity of the connection's sealing element. Annular chamber So may be sealed at the top and bottom by the self-sealing packer material contained within annular grooves 62. Additional sealing means may be used to vary the width of annular chamber 80. Preferably, annular grooves 78 positioned within the housing 70 and containing self-sealing packer material 65 are longitudinally spaced apart to seal the ends of annular chamber 80. The annular sealing means 65 sealingly engage the connection and allow the applications of pressurized hydrostatic fluid supplied into the annular chamber 80 formed between annular housing 70 and the outside annular surface of the coupling 40. As the bearing pressure of the interference sealing threads 17 of the connection 14 are sensitive to the pressure applied by hydrostatic fluid applied against the outer circumference of the connection 14 within annular chamber 80, leak testing fluid or other hydrostatic fluid may be introduced through conduit 82 into annular chamber 80 at controlled pressures to manipulate the bearing pressure of the connection's sealing element. Manipulation of the bearing pressure in this manner is independent from and not affected by the introduction of testing fluid through conduit 28 into annular chambers 66. The manipulation of bearing pressure is useful in partially simulating the pressures encountered during the drilling and completion operations and throughout the productive life of the well without totally distorting the sealing capability of the connection 14.

Figure 6B:
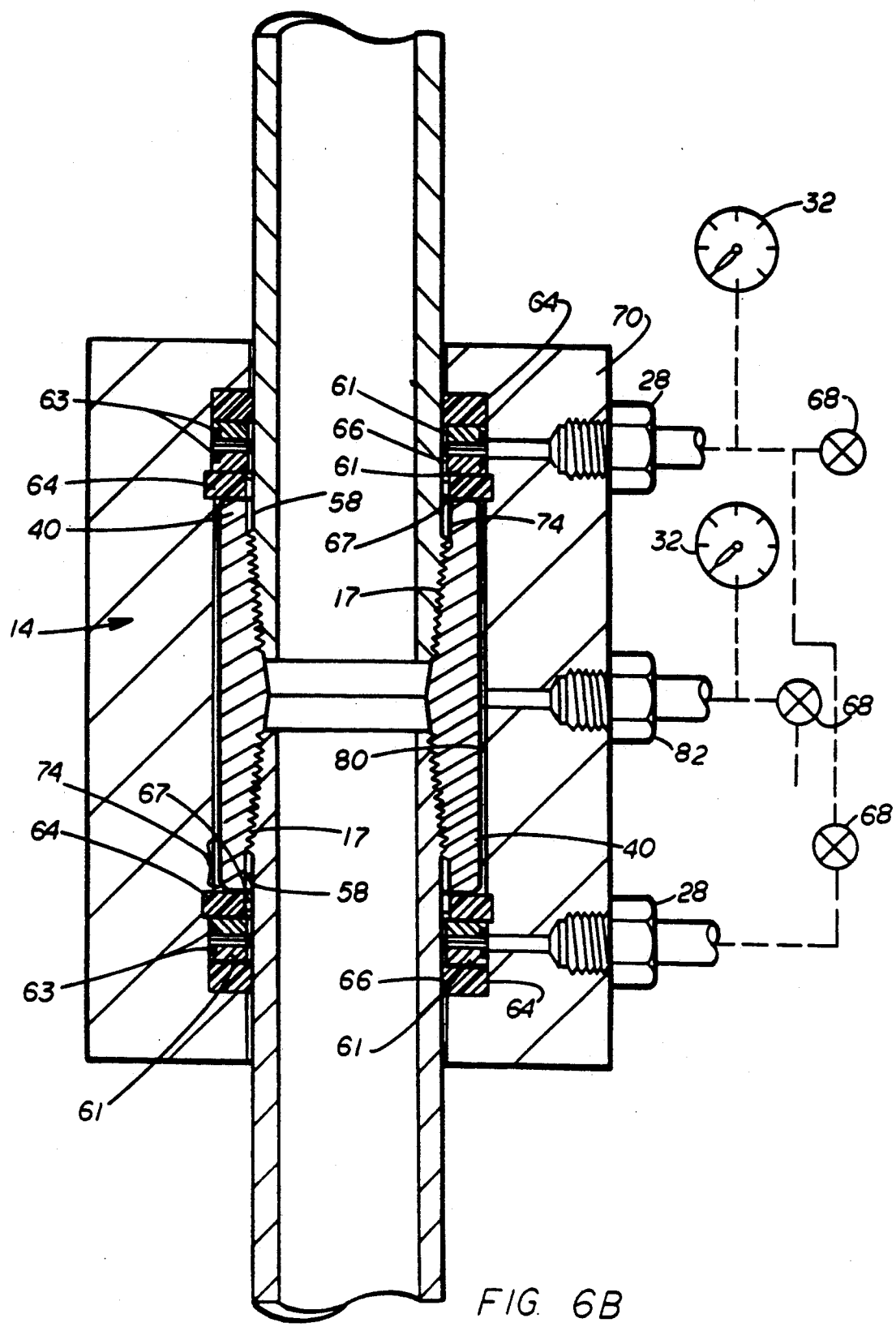
FIG. 6B is a view similar to FIG. 6A but shown still another form of the present invention for testing the pipe connection.

In the embodiment of the improved method and apparatus according to this invention shown in FIG. 6B, the housing 70 and the self-sealing material 64 contained therein are constructed whereby during the testing procedures a sealing engagement is established against the outer annular face of the coupling 40 and the outer circumferential surface of the adjacent joint of pipe threaded into the coupling 40 at that location. The pressurized hydrostatic testing fluid is supplied through conduit 28 between compression discs 61 into annular chamber 66 containing slotted retainer ring 67. O-rings 63 seal compression discs 61 against housing 70 as the compression discs assist in engaging the self-sealing packer material 64 against the connection 14. Thus, when the pressurized hydrostatic testing fluid is in fluid communication with the radial orifice 58 leading into the interference threads 17, the pressures of the testing procedure are applied radially against the outer circumferential surface of the adjacent joint of pipe threaded into the coupling 40 and longitudinally through the slotted retainer ring 67 against the outer annular face of the coupling 40, rather than even radially against the annular area 74 of the coupling. As such, the applied test pressures do not apply radial pressures to the interference seal formed by the threads 17 and thus do not affect the bearing pressure of such interference seal and, accordingly, there is no significant adverse impact on the accuracy of the testing procedure as a result of the application of the testing pressures themselves.

The annular housing or body 70 is also structured to provide another annular chamber 80 located in a selected area in the vicinity of the connection's sealing element. Annular chamber 80 is sealed at the top and bottom by the self-sealing packer material 64. Additional sealing means may be used to vary the width of annular chamber 80. The annular sealing means 64 sealingly engage the connection and allow the applications of pressurized hydrostatic fluid supplied into the annular chamber 80 formed between annular housing 70 and the outside annular surface of the coupling 40. As the bearing pressure of the interference sealing threads 17 of the connection 14 is sensitive to the pressure applied by hydrostatic fluid applied against the outer circumference of the connection 14 within annular chamber 80, leak testing fluid or other hydrostatic fluid may be introduced through conduit 82 into annular chamber 80 at controlled pressures to manipulate the bearing pressure of the connection's sealing element. Manipulation of the bearing pressure in this manner is independent from and not affected by the introduction of testing fluid through conduit 28 into annular chambers 66. The manipulation of bearing pressure is useful in partially simulating the pressures encountered during the drilling and completion operations and throughout the productive life of the well without totally distorting the sealing capability of the connection 14.

Figure 7:
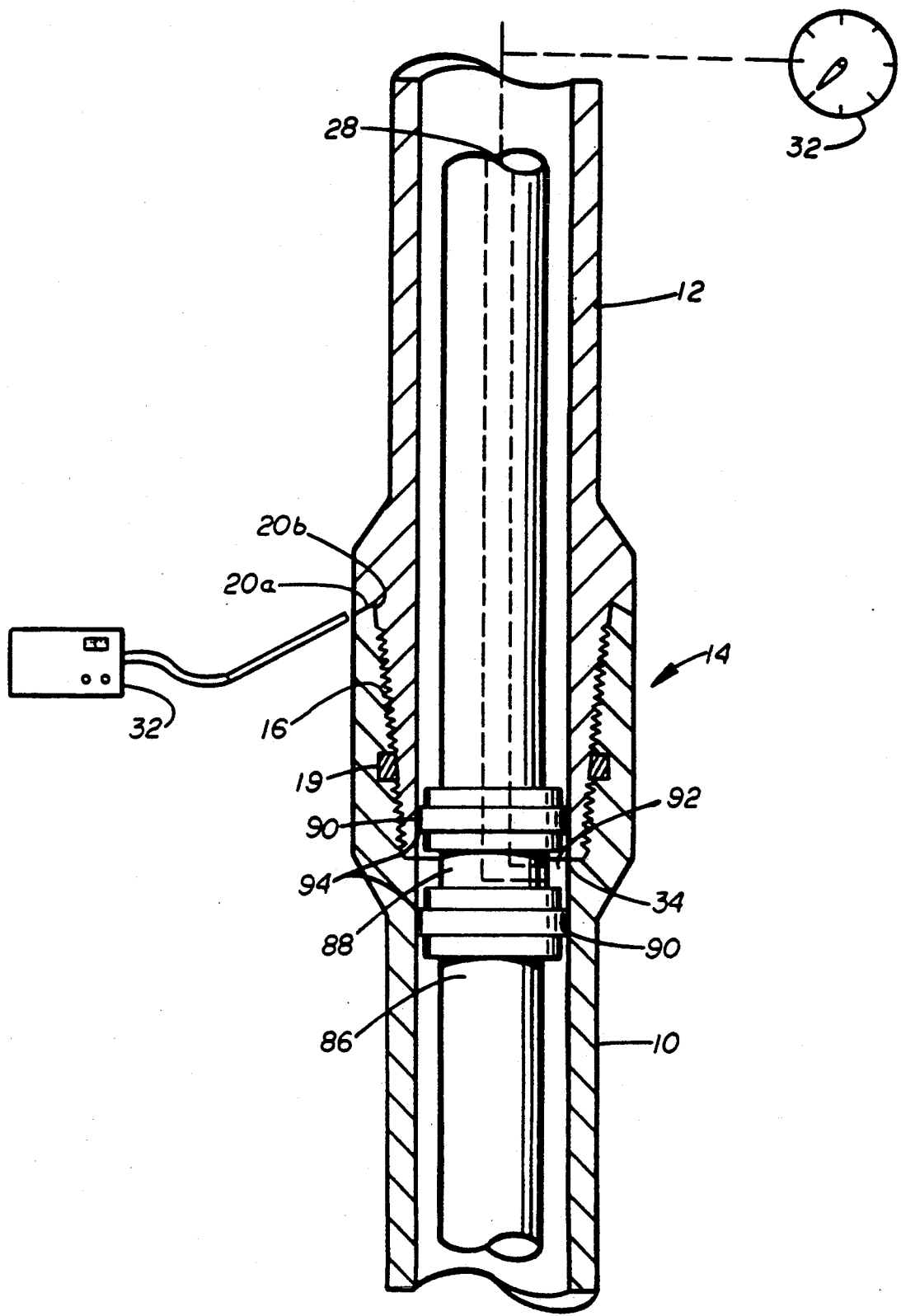
FIG. 7 is a similar longitudinal cross-section of a threaded pipe joint with a form of the improved method and apparatus of the present invention for testing such threaded joint internally.

FIG. 7 is a longitudinal cross-sectional view of an integral connection formed by threading together two joints of pipe with an embodiment of the improved method and apparatus according to this invention being utilized to test the connection internally. The integral connection shown in FIG. 7, generally known in the industry as a "premium-style" connection, contains interference, non-sealing threads. Positioned within the threaded area is a seal ring 19 constituting a sealing means. other sealing means 20a and 20b, comprised of mating corresponding annular surfaces on the male and female ends of the pipe joints 10 and 12, are located at the external radial orifice. This connection was chosen as an example to describe the internal hydrostatic testing apparatus because there is no interference seal located at the internal radial orifice.

Positioned within the connected pipe joints 10 and 12 for accomplishing internal testing of connection 14 is an embodiment of the improved method and apparatus according to this invention generally identified by the numeral 86. The internal testing apparatus 86 includes an elongated tubular member 88 having longitudinally spaced apart sealing means 90 for sealing against the connection 14 immediately adjacent the internal radial orifice 34 and on either side thereof. Hydrostatic testing fluid is introduced through conduit 28 into the annular chamber 92 formed between the tubular member 88 of the testing apparatus and the internal surface of the connection 14. A leak in the connection 14 is detected by the use of commercially available means 32, such as, a Totco dual needle gauge, part #215041-104, for detecting a loss of the water from the annular test chamber 92 or, in the case that gas is utilized as the hydrostatic testing medium, a "sniffer," such as, the Deluxe Gas Detector, model #21250 manufactured by Gow-Mac. As the annular chamber 92 is sealed at the top and bottom by packer means 90 specifically located in the immediate vicinity of the internal radial orifice 34, the pressure applied by the testing fluid is against the radial orifice 34 leading into the threads 16. The hydrostatic test fluid applies pressure against the internal annular surface of the connection 14 in the area generally shown by the numeral 94 and not against the internal annular surface of connection 14 in the radial vicinity of the sealing elements 19, 20a and 20b, thus avoiding any significant change in the bearing pressure of the interference seals and thereby resulting in a more accurate test measurement of the sealing capability of the connection 14.

Figure 8:
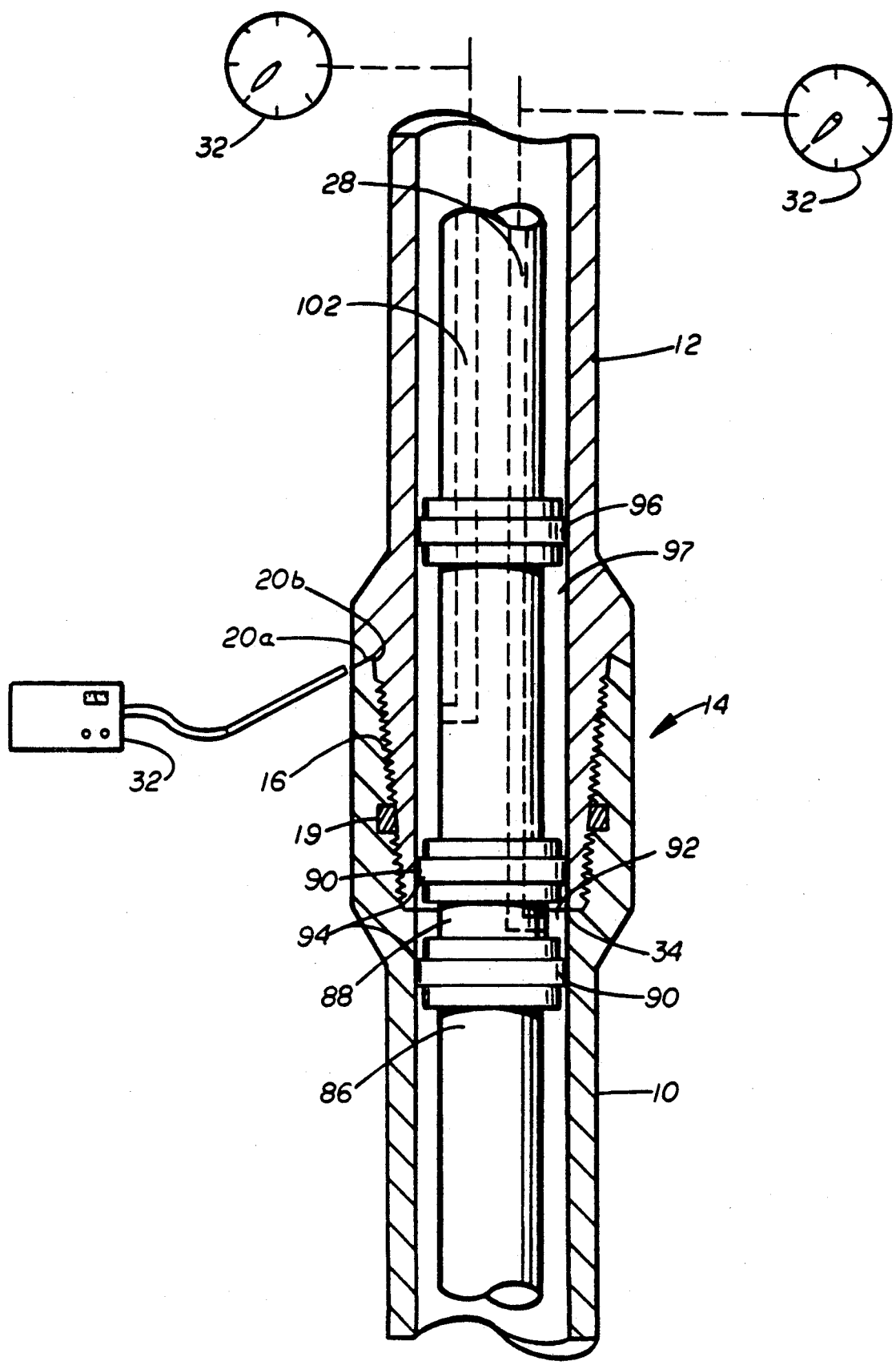
FIG. 8 is another similar view of a threaded pipe joint with another form the improved method and apparatus for testing the joint internally.

FIG. 8 is a longitudinal cross-sectional view of an integral connection formed by two joints of pipe threaded together with an embodiment of the improved method and apparatus according to this invention having multiple test chambers being utilized to test the connection internally. As is FIG. 7, the integral connection has sealing means positioned within the interference, non-sealing threads and sealing means positioned at the external radial orifice.

Positioned within the connected pipe joints 10 and 12 for accomplishing internal testing of connection is another embodiment of the improved method and apparatus according to this invention generally identified by the numeral 86. The internal testing apparatus 86 includes an elongated tubular member 88 having longitudinally spaced apart sealing means 90 for sealing against the connection 14 immediately adjacent the internal radial orifice 34 and on either side thereof. Also mounted on the tubular member 88 is additional means 96 for sealing above the connection 14. Thus, there are two annular chambers being formed between the elongated tubular member 88 of the testing apparatus 86 and the internal surface of the connection 14 formed by pipe joints 10 and 12 being threaded together. To internally test the connection 14 for a leak, hydrostatic test fluid is introduced through conduit 28 into the annular chamber 92 formed between the tubular member 88 of the testing apparatus and the internal surface of the connection 14. A leak in the connection 14 is detected by the use of commercially available means 32, such as, a Totco dual needle gauge, part #215041-104, for detecting a loss of the water from the annular test chamber 92 or, in the case that gas is utilized as the hydrostatic testing medium, a "sniffer," such as, the Deluxe Gas Detector, model #21-250 manufactured by Gow-Mac. As the annular chamber 92 is sealed at the top and bottom by packer means 90 specifically located in the immediate vicinity of the internal radial orifice 34, the pressure applied by the testing fluid is against the radial orifice 34 leading into the threads 16. The hydrostatic test fluid applies pressure against the internal annular surface of the connection 14 in the area generally shown by the numeral 94 and not against the internal annular surface of connection 14 in the radial vicinity of the sealing elements 19, 20a and 20b, thus avoiding any significant change in the bearing pressure of the interference seals and thereby resulting in a more accurate test measurement of the sealing capability of the connection 14.

The second annular chamber 97 is located in the radial vicinity of the interference seals 19, 20a and 20b. As the bearing pressure of the interference seals of the connection 14 is sensitive to the pressure applied by hydrostatic fluid within annular chamber 97, leak testing fluid or some other hydrostatic fluid may be introduced through conduit 102 into annular chamber 97 at controlled pressures to manipulate the bearing pressure of the interference seals. Manipulation of the bearing pressure in this manner is independent from and not affected by the introduction of testing fluid through conduit 28 into annular chamber 92. The manipulation of bearing pressure is useful in partially simulating the pressures encountered during the drilling and completion operations and throughout the productive life of the well without totally distorting the sealing capability of the connection 14.

Figure 9:
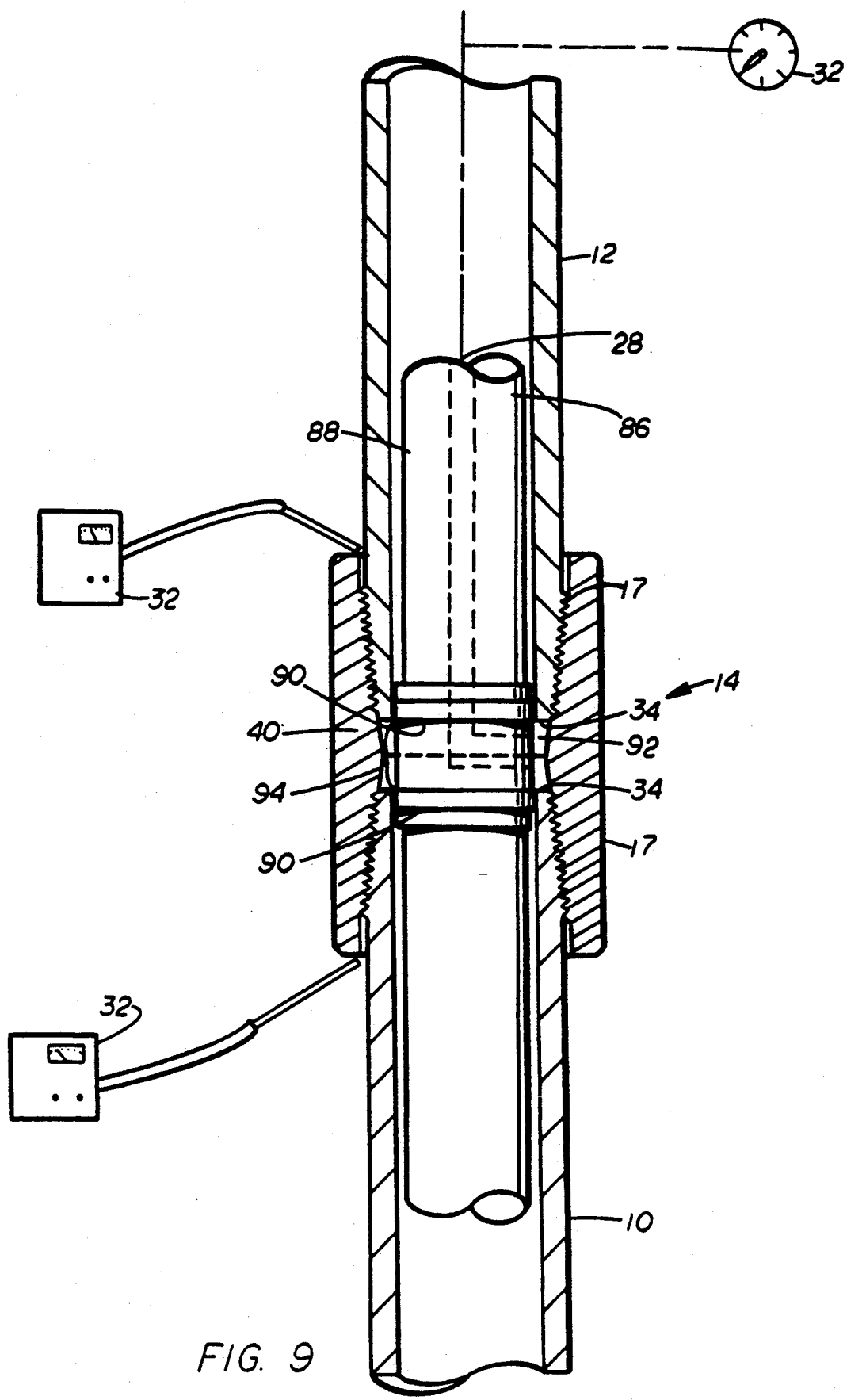
FIG. 9 is still another view of a threaded pipe joint with a coupling and the improved method and apparatus for testing the joint internally.

FIG. 9 is a longitudinal cross-sectional view of a connection formed by threading two joints of pipe into a coupling with an embodiment of the improved method and apparatus according to this invention positioned within the connection and being utilized to test the connection internally. Pipe joints 10 and 12 are threaded into a coupling 40 to form a connection generally identified by the numeral 14. As discussed with respect in FIG. 1B, the threads 17 on the pipe segments and the coupling are designed to be interference sealing threads and thus constitute the connection's sealing element. Positioned within the connected pipe joints for accomplishing internal testing of the connection 14 is an embodiment of the improved method and apparatus according to this invention generally identified by the numeral 86. The internal testing apparatus 86 includes an elongated tubular member 88 having longitudinally spaced apart sealing means 90 for sealing at the ends of pipe joints 10 and 12 inside of coupling 40. Hydrostatic testing fluid is introduced through conduit 28 into the annular chamber 92 formed between the tubular member 88 of the testing apparatus and the internal surface of the coupling 40. A leak in the connection 14 is detected by the use of commercially available means 32, such as, a Totco dual needle gauge, part #215041-104, for detecting a loss of the water from the annular test chamber 92 or, in the case that gas is utilized as the hydrostatic testing medium, a "sniffer," such as, the Deluxe Gas Detector, model #21250 manufactured by Gow-Mac. As the annular chamber 92 is sealed at the top and bottom by packer means 90 specifically located at the end of pipe joints 10 and 12, the pressure applied by the testing fluid is against the radial orifices 34 leading into the interference sealing threads 17. The hydrostatic test fluid applies pressure against the internal annular surface of the coupling 40 in the area generally shown by the numeral 94 and not against the internal annular surface of connection 14 in the radial vicinity of the interference seal threads 17 thus avoiding any significant change in the bearing pressure of the interference sealing threads 17 and thereby resulting in a more accurate test measurement of the sealing capability of the connection 14.

Figure 10:
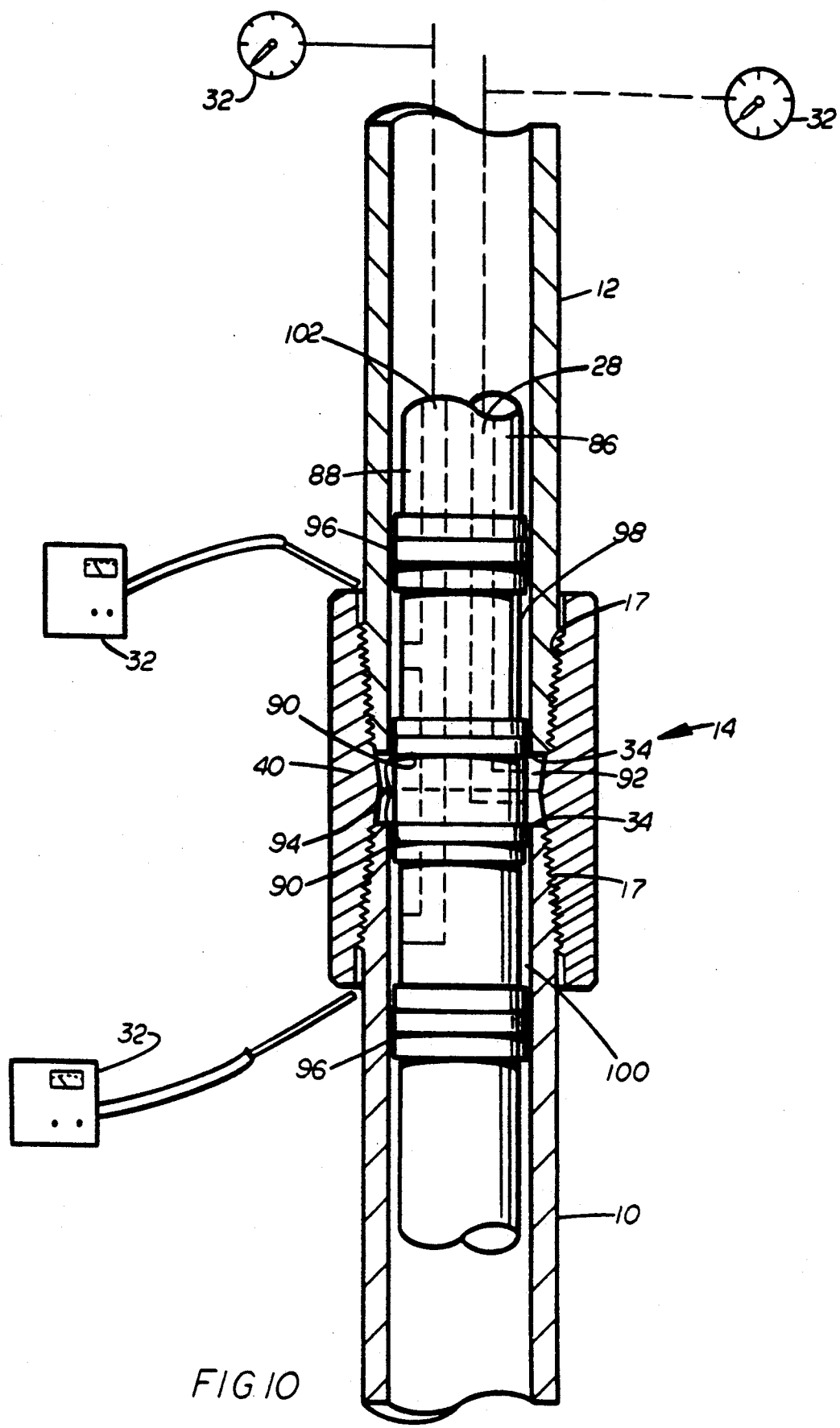
FIG. 10 is another form of an improved method and apparatus of the present invention for internally testing the joint and showing multiple test chambers.

FIG. 10 is a longitudinal cross-sectional view of a connection formed by threading two joints of pipe into a coupling with an embodiment of the improved method and apparatus according to this invention having multiple test chambers positioned within the connection and utilized to test the connection internally. Pipe joints 10 and 12 are threaded into a coupling 40 to form a connection generally-identified by the numeral 14. As discussed in connection with FIG. 4A, the threads 17 along the connection 14 are designed to be interference sealing threads and thus constitute the connection's sealing element. Positioned within the connected pipe joints for accomplishing internal testing of the connection 14 is another embodiment of the improved method and apparatus according to this invention again generally identified by the numeral 86. The internal testing apparatus 86 includes an elongated tubular member 88 having means 90 for sealing at the end of pipe joints 10 and 12 inside of coupling 40. Also mounted on the tubular member 88 are additional means 96 for sealing above and below the connection 14. Thus, three annular chambers are formed along the tubular member 88, the three annular chambers being formed between the elongated tubular member 88 of the testing apparatus 86 and the internal surface of the coupling 40 and pipe joints 10 and 12. To internally test the connection 14 for a leak, hydrostatic test fluid in introduced through conduit 28 into annular chamber 92 against the radial orifices 34 leading into the interference sealing threads 17 and against the internal surface of the coupling 40 in the area generally denoted by the numeral 94. A leak in the connection 14 is detected by the use of commercially available means 32, such as, a Totco dual needle gauge, part #215041-104, for detecting a loss of the water from the annular test chamber 92, or, in the case that gas is utilized as the hydrostatic testing medium, a "sniffer," such as, the Deluxe Gas Detector, model #21-250 manufactured by Gow-Mac. As annular chamber 92 is sealed at the top and bottom by packer means 90 specifically located at the end of pipe joints 10 and 12 such that the pressure applied by the testing fluid would be against the internal annular surface of the coupling 40 in the area generally shown by the numeral 94 and not against the internal annular surface of connection 14 in the radial vicinity of interference threads 17, there is no significant change in the bearing pressure of the interference sealing threads 17. Thus, this embodiment of the improved method and apparatus according to this invention produces an accurate test measurement of the sealing capability of the connection 14.

The internal testing apparatus 86 depicted in FIG. 10 also is structured to provide two additional annular chambers 98 and 100 located in selected areas in the radial vicinity of the interference sealing threads 17. As the bearing pressure of the interference threads 17 of the connection 14 is sensitive to the pressure applied by hydrostatic fluid within these annular chambers 98 and 100, leak testing fluid or some other hydrostatic fluid may be introduced through conduit 102 into annular chambers 98 and 100 at controlled pressures to manipulate the bearing pressure of the interference sealing threads 17. Manipulation of the bearing pressure in this manner is independent from and not affected by the introduction of testing fluid through conduit 28 into annular chamber 92. The manipulation of bearing pressure is useful in partially simulating the pressures encountered during the drilling and completion operations and throughout the productive life of the well without totally distorting the sealing capability of the connection 14.

Figure 11:
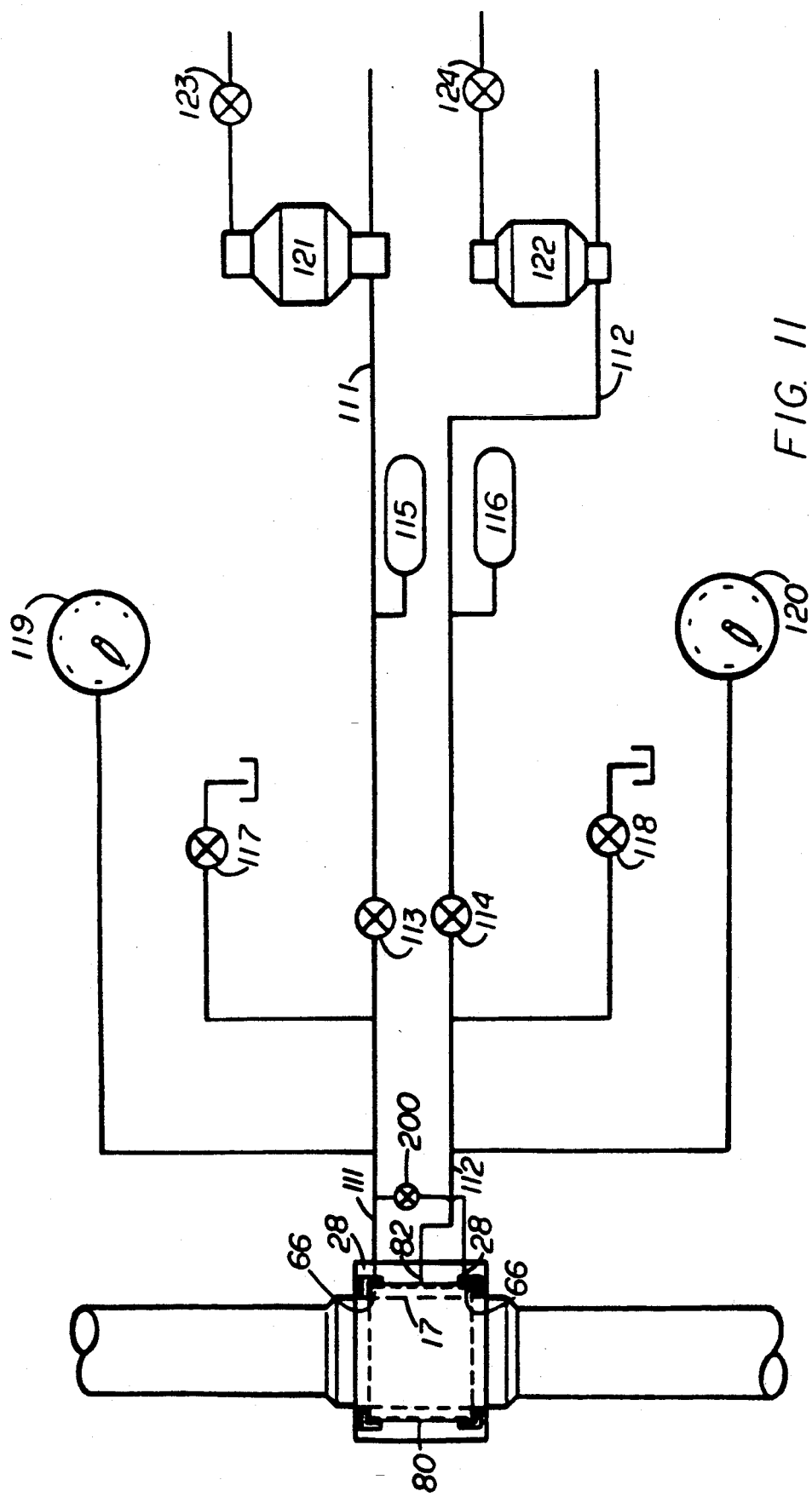
FIG. 11 is still another view of a threaded pipe joint with a coupling and illustrating a modified form of the improved external testing method and apparatus of the present invention having multiple test chambers.

FIG. 11 is a mechanical flow diagram of a typical manual control system for leak testing externally a connection between two joints of pipe threaded into a coupling with an embodiment of the improved method and apparatus according to this invention, similar to that shown in FIG. 6A, having multiple test chambers. Lines 111 and 112 introduce pressurized leak testing fluid into conduits 28 and 82, respectively. Conduits 28 lead into annular chambers 66 which are used to contain pressurized test fluid to detect a leak through sealing means 17, while conduit 82 leads into annular chamber 80 which receives leak testing fluid or other hydrostatic fluid to apply pressure to the outer annular surface of the connection in the vicinity of the interference between the coupling and the pipe threaded therein to manipulate the bearing pressure of the connection's sealing element, independent from and not affected by the introduction of testing fluid through conduits 28 into annular chambers 66. Pressure is generated by two air operated high pressure pumps 121 and 122. Pump 121 applies pressurized test fluid into annular chambers 66 through conduits 28, and pump 122 applies leak testing fluid or other hydrostatic fluid into annular chamber 80 through conduit 82. Pumps 121 and 122 are selectively controlled by air supply valves 123 and 124 respectively. The high pressure output of pumps 121 and 122 are connected to high pressure accumulators 115 and 116 to speed up the testing procedure and also to help dampen out any pressure surges due to the low volume of test fluid required by the improved leak testing apparatus. Control valves 113 and 114 are used to connect the output from high pressure pumps 121 and 122 through lines 111 and 112 to their respective conduits 28 and 82. Line 111 branches off to connect to both conduits 28 leading into annular chambers 66. Isolator valve 200 is located on the branch leading to the lower conduit 28. Bleed-off valves 117 and 118 are located between the control valves 113 and 114 and conduits 28 and 82. Also located similarly are pressure sensing means 119 and 120.

In a manual control system as illustrated, the test sequence may proceed as follows: Pump 121 and pump 122 are turned on by opening their respective air supply valves 123 and 124, thus pressurizing accumulators 115 and 116 with test fluid to approximately the pressure desired to perform the test. Pump 121 and pump 122 are then turned off by closing their respective air supply valves 123 and 124. Control valve 113 is then opened allowing pressurized test fluid to flow through conduits 28 and into annular chambers 66. Pump 121 is then turned on if necessary to reach the specific test pressure required. The test pressure is observed on pressure sensing means 119. In the event the pressure begins to drop in annular chambers 66, thus indicating a leak, isolator valve 200 is closed and the test pressure in the upper annular chamber 66 is observed on pressure sensing means 119.

As an option previously discussed, fluid pressure may be applied into annular chamber 80 by opening control valve 114 allowing pressurized leak testing fluid or other hydrostatic fluid to flow through conduit 82 and into annular chamber 80. Pump 122 is then turned on if necessary to reach the specific test pressure required. The pressure in annular chamber 80 is observed on pressure sensing means 120.

Note that using this system, the pressures in annular chambers 66 and 80 may be cycled in any combination suited to the type of connection being tested and other factors having bearing on the leak properties of the connection, such as expected well conditions.

After the specific test sequence is completed, control valves 113 and 114 are closed and pressure is bled off the annular chambers 66 and 80 by opening their respective bleed-off valves 117 and 118. Both bleed-off valves are then closed, isolator valve 200 is opened if it were closed during the test sequence, the leak testing apparatus is removed from the connection, and the cycle is repeated on the next connection.

Figure 12:
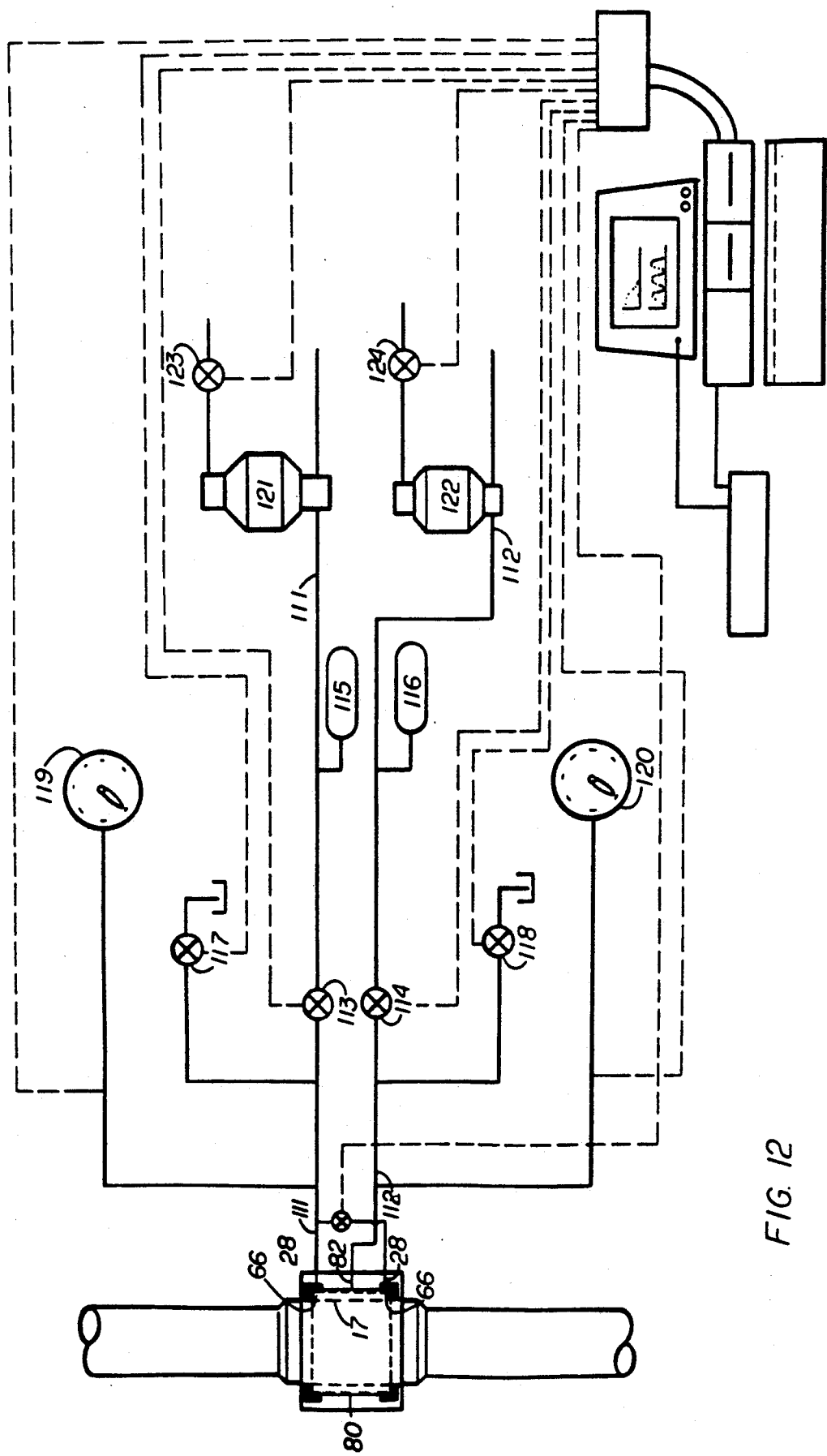
FIG. 12 is a mechanical flow diagram of an automatic control system used with the improved method and apparatus of the present invention for external testing of a threaded pipe connection having a coupling.

FIG. 12 is a mechanical flow diagram of an automatic control system for leak testing externally a connection between two joints of pipe threaded into a coupling with an embodiment of the improved method and apparatus according to this invention, similar to that shown in FIG. 6A, having multiple test chambers. The automatic control system may be used to automatically perform a specific testing sequence, as discussed in the review of FIG. 11. The control valves 113, 114, 117, 118, and 200 and air supply valves 123 and 124 are operated by commercially available electrical or pneumatic operators or actuators. These electrical or pneumatic operators or actuators are controlled by digital or analog output signals from a computer utilizing commercially available interface cards. Pressure signals and values are input into the computer by way of pressure transducer signals and verified by analog pressure sensing means. A preprogrammed test sequence may then proceed, initiated by operator input into the computer, which in turn then monitors pressures, opens and closes in correct sequence and at the correct time control valves 113, 1141 117, 118, and 200 and air supply valves 123 and 124. Adequate software currently exists to enable this type of computer sequencing. The test procedure and results may be stored or recorded on video tape utilizing a conventional video tape recorder interfaced with the computer monitor for future reference. Currently, computer software exists which would enable the operator to simultaneously control pressure in all annular chambers, control the time pressures are held and sound an alarm or note otherwise in the event a leak or drop in pressure is observed or detected.

Thus, this invention provides an improved method and apparatus for the hydrostatic testing of the integrity of a connection between two sections of pipe. Many variations in the form of the preferred embodiments of the improved method and apparatus will now be apparent to those skilled in the art. For example, the elastomer seal element may be made to be energized in a similar manner as that shown in U.S. Pat. No. 4,010,633 to Malvern M. Hasha; the testing apparatus housing may be made so that the tubular members are run through the housing for leak testing in a similar manner as that shown in U.S. Pat. Nos. 4,132,111 and 4,136,552 to Malvern M. Hasha or made to latch around the tubular members; the test chambers may be different in number and cover many different configurations; pressure sources between chambers may be interconnected through different regulating means to control pressures; bearing pressure manipulation may be realized through different means such as the application of a direct bearing pressure to the outside or inside annular surface of the connection in the vicinity of the sealing means by some mechanical means which is pressure actuated or otherwise actuated. Numerous types of sealing means and packers, valving, control gages, computers and video cassette recorders well known to those skilled in the art can be utilized to practice the invention. Therefore, the invention should not be limited to the preferred embodiments, but rather should extend to the full scope and spirit of the invention described and claimed in the appended claims.

What we claim is:

1. An improved method for hydrostatically testing connections between segments of pipe, comprising:
    selectively applying pressurized hydrostatic test fluid such that the pressures are principally applied to a selected localized area in the vicinity of the orifice leading into the sealing elements of the connection and there is no substantial test pressure applied radially to the inner or outer annular surfaces of the connection in the vicinity of the sealing elements of the connection which would tend to substantially affect the bearing pressure of the sealing element whereby such test pressure does not adversely affect the accuracy of the testing process.

2. An improved method for hydrostatically testing connections between segments of pipe, comprising:
   selectively applying pressurized hydrostatic test fluid such that the pressures are principally applied in the vicinity of the radial orifice leading into the sealing elements of the connection and there is no substantial test pressure applied radially to the inner or outer annular surfaces of the connection in the vicinity of the sealing elements of the connection which would tend to substantially affect the bearing pressure of the sealing elements;
   recording the generated test data and static and dynamic testing parameters in digitalized form in computer storage;
   determining the existence of a leak in the connection from the data recorded during the test and stored in the computer;
   using said computer storage data to control the application of the testing fluid in the pressure zones to achieve maximum accuracy in the leak testing procedure; and
   providing a display of the data gathered in the above steps to form a digital definition of the parameters of the test and the characteristics of the connection.

3. An improved method for hydrostatically testing connections between segments of pipe, comprising:
   selectively applying pressurized hydrostatic test fluid such that the pressures are principally applied to a selected localized area in the vicinity of the orifice leading into the sealing elements of the connection such that the least change in bearing pressure between the sealing element of the connection is obtained per unit of applied hydrostatic test pressure whereby such test pressure does not adversely affect the accuracy of the testing process.

4. An improved method for hydrostatically testing a connection between segments of pipe wherein the bearing pressure of the sealing elements of the connection are sensitive to the applied test pressures, comprising:
   determining the locations in the vicinity of the connection at which means should be located to establish pressure zones in which the hydrostatic pressures shall be applied, one of said pressure zones being located whereby the least affect in bearing pressure between the sealing elements of the connection is obtained per unit of applied hydrostatic test pressure and another of said pressure zones being located whereby applied hydrostatic pressure will result in the control of the bearing pressure of the sealing elements of the connection; and
   selectively applying pressurized hydrostatic test fluid to such pressure zones such that the connection is tested for leaks under conditions whereby the bearing pressure of the sealing elements of the connection is controlled.

5. An improved method for internally hydrostatically testing the integral connection between two sections of pipe threaded together wherein the connection's seal is provided by the interference between mating surfaces on the corresponding male and female ends of the sections of pipe, comprising:
   selectively applying pressurized hydrostatic test fluid such that the pressures are principally applied to a selected localized area in the vicinity of the internal orifice leading into the connection's threads and there are no substantial test pressure applied radially to the inner annular surface of the connection in the vicinity of the interference between the mating surfaces on the corresponding male and female ends of the sections of pipe which would tend to substantially affect the bearing pressure of such interference seal.

6. An improved method for internally hydrostatically testing the integral connection between two sections of pipe threaded together wherein the connection's seal is provided by the interference between mating surfaces on the corresponding male and female ends of the sections of pipe, comprising:
   selectively applying pressurized hydrostatic test fluid such that the pressures are principally applied in the vicinity of the internal radial orifice leading into the sealing elements of the connection and there are no substantial pressures applied radially to the inner annular surface of the connection in the vicinity of the interference between the mating surfaces on the corresponding male and female ends of the sections of pipe which would tend to substantially affect the bearing pressure of such interference seal; and
   in addition to the selective application of the hydrostatic test pressures, selectively applying pressurized hydrostatic fluid to the inside o the connection in the vicinity of the interference seal whereby pressure is applied radially to or across the interference between the mating surfaces on the corresponding male and female ends of the sections of pipe to control the bearing pressure of such interference seal whereby during the testing procedure the pressures that may be encountered during the drilling and completion operations and throughout the productive life of the well may be simulated.

7. An improved method for internally hydrostatically testing the connection between two sections of pipe threaded into a coupling in a fashion such that the connection presents two internal orifices between the ends of the sections of pipe and the coupling, comprising:
   selectively applying pressurized hydrostatic test fluid such that the pressures are principally applied to selected localized areas in the vicinity of the internal orifices leading into the sealing elements of the connection and there are no substantial pressures applied radially to the inner annular surface of the connection in the vicinity of the interference between the coupling and the pipe threaded therein where the connection's sealing element is formed which would tend to substantially affect the bearing pressure of such interference seal.

8. An improved method for internally hydrostatically testing the connection between two sections of pipe threaded into a coupling in a fashion such that the connection presents two internal radial orifices between the ends of the sections of pipe and the coupling, comprising:
   selectively applying pressurized hydrostatic test fluid such that the pressures are principally applied in the vicinity of the internal radial orifices leading into the sealing elements of the connection and there are no substantial pressures applied by the hydrostatic test fluid radially to the inner annular surface of the connection in the vicinity of the interference between the coupling and the pipe threaded therein where the connection's sealing element is formed which would tend to substantially affect the bearing pressure of such interference seal; and in addition to the selective application of the hydrostatic test pressures, selectively applying pressurized hydrostatic fluid to the inside of the connection in the vicinity of the interference seal whereby pressure is applied radially to or across the interference between the coupling and the pipe threaded therein where the connection's sealing element is formed to control the bearing pressure of such interference seals whereby during the testing procedure the pressures that may be encountered during the drilling and completion operations and throughout the productive life of the well may be simulated.

9. An improved apparatus for internally hydrostatically testing the integral connection between two sections of pipe threaded together such that the connection presents an internal radial orifice and the connection's seal is provided by the interference between mating surfaces on the corresponding male and female ends of the sections of pipe, having:

a tubular member positioned within the connected pipe joints containing means for sealingly engaging the connection in the immediate vicinity of and on either side of the internal radial orifice; said tubular member providing an annular chamber which is in fluid communication with the radial orifice leading into the sealing elements of the connection when the sealing means surrounding the tubular member are in sealing engagement with the connection;

valve means associated with said tubular member for admitting into the annular chamber a pressurized hydrostatic testing fluid;

said tubular member and its sealing means and the hydrostatic test fluid apply pressures principally in the vicinity of the radial orifice leading into the sealing elements of the connection and apply no substantial radial pressures to the inner annular surface of the connection in the vicinity of the interference between the mating surfaces on the corresponding male and female ends of the sections of pipe which would tend to substantially affect the bearing pressure of such interference seal; and means for determining a possible leak in the connection by detecting a loss of the hydrostatic testing fluid from the annular chamber through the connection's sealing element.

10. An improved apparatus for internally hydrostatically testing the integral connection between two sections of pipe threaded together such that the connection presents an internal radial orifice and the connection's seal is provided by the interference between mating surfaces on the corresponding male and female ends of the sections of pipe, having:

a tubular member positioned within the connected pipe joints containing means for sealingly engaging the connection in the immediate vicinity of and on either side of the internal radial orifice; said tubular member also containing means for sealingly engaging the inner annular surface of the connection in the vicinity of the interference seal, said tubular member providing annular chambers which are in fluid communication with the radial orifice leading into the sealing elements of the connection and the inside of the connection in the vicinity of the interference seal when the sealing means surrounding the tubular member are in sealing engagement with the connection;

valve means associated with said tubular member for admitting into the annular chambers a pressurized hydrostatic testing fluid;

said tubular member and its sealing means for the annular chamber which engages the connection in the immediate vicinity of the internal radial orifice and the hydrostatic test fluid apply pressures principally in the vicinity of the radial orifice leading into the sealing elements of the connection and apply no substantial radial pressures to the inner annular surface of the connection in the vicinity of the interference between the mating surfaces on the corresponding male and female ends of the sections of pipe which would tend to substantially affect the bearing pressure of such interference seal;

said tubular member and its sealing means for the annular chamber which engages the inner annular surface of the connection in the vicinity of the interference seal and the hydrostatic test fluid apply pressures radially to or across the interference between the mating surfaces on the corresponding male and female ends of the sections of pipe to control the bearing pressure of such interference seal; and means for determining a possible leak in the connection by detecting a loss of the hydrostatic testing fluid from the annular chamber through the connection's sealing element.

11. An improved apparatus for internally hydrostatically testing the connection between two sections of pipe threaded into a coupling in a fashion such that the connection presents two internal radial orifices between the ends of the sections of pipe and the coupling, having:

a tubular member positioned within the connected pipe joints containing means for sealingly engaging the connection in the immediate vicinity of the internal radial orifices at the ends of the pipe joints threaded into the coupling;

said tubular member providing an annular chamber which is in fluid communication with the radial orifices leading into the sealing elements of the connection when the sealing means surrounding the tubular member are in sealing engagement with the connection;

valve means associated with said tubular member for admitting into the annular chamber a pressurized hydrostatic testing fluid;

said tubular member and its sealing means and the hydrostatic test fluid apply pressures principally in the vicinity of the radial orifices leading into the sealing elements of the connection and apply no substantial radial pressures to the inner annular surface of the connection in the vicinity of the interference between the coupling and the pipe threaded therein where the connection's sealing element is formed which would tend to substantially affect the bearing pressure of such interference seal; and means for determining a possible leak in the connection by detecting a loss of the hydrostatic testing fluid from the annular chamber through the connection's sealing element.

12. An improved apparatus for internally hydrostatically testing the connection between two sections of pipe threaded into a coupling in a fashion such that the connection presents two internal radial orifices between the ends of the sections of pipe and the coupling, having:

- a tubular member positioned within the connected pipe joints containing means for sealingly engaging the connection in the immediate vicinity of the internal radial orifices at the ends of the pipe joints threaded into the coupling; said tubular member also containing means for sealingly engaging the inner annular surface of the connection in the vicinity of the interference seal, said tubular member providing annular chambers which are in fluid communication with the radial orifices leading into the sealing elements of the connection and the inside of the connection in the vicinity of the interference seal when the sealing means surrounding the tubular member are in sealing engagement with the connection;
- valve means associated with said tubular member for admitting into the annular chambers a pressurized hydrostatic testing fluid;
- said tubular member and its sealing means for the annular chambers which engage the connection in the immediate vicinity of the internal radial orifices at the ends of the pipe joints threaded into the coupling and the hydrostatic test fluid apply pressures principally in the vicinity of the radial orifices leading into the sealing elements of the connection and apply no substantial radial pressures to the inner annular surface of the connection in the vicinity of the interference between the coupling and the pipe threaded therein where the connection's sealing element is formed which would tend to substantially affect the bearing pressure of such interference seal;
- said tubular member and its sealing means for the annular chamber which engages the inner annular surface of the connection in the vicinity of the interference seal and the hydrostatic test fluid apply pressures radially to or across the interference between the coupling and the pipe threaded therein where the connection's sealing element is formed to control the bearing pressure of such interference seal; and
- means for determining a possible leak in the connection by detecting a loss of the hydrostatic testing fluid from the annular chamber through the connection's sealing element.

13. An improved apparatus for hydrostatically testing connections between segments of pipe as set forth in claims 9 through 12 alternatively, comprising:
- means for automating the control of valve means associated with said apparatus; and
- means for recording, storing, and displaying generated test data and static and dynamic testing parameters.

* * * * *